US011580503B1

(12) United States Patent
Woodard et al.

(10) Patent No.: US 11,580,503 B1
(45) Date of Patent: *Feb. 14, 2023

(54) SYSTEM AND METHOD FOR MANAGING AND AUTOMATICALLY RESCHEDULING SHOWINGS OF REAL ESTATE LISTINGS BASED ON MULTIPLE FACTORS

(71) Applicant: ShowingTime.com, Inc., Chicago, IL (US)

(72) Inventors: Scott E Woodard, New Buffalo, MI (US); Michael P Caputo, Aurora, IL (US); Paul G Bergman, Chicago, IL (US); David C Bernhard, Downers Grove, IL (US)

(73) Assignee: MFTB Holdco, Inc., Seattle, WA (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/114,608

(22) Filed: Dec. 8, 2020

Related U.S. Application Data

(63) Continuation-in-part of application No. 17/078,941, filed on Oct. 23, 2020, now Pat. No. 11,379,938.

(51) Int. Cl.
*G06Q 10/10* (2012.01)
*G06Q 50/16* (2012.01)
*G06Q 10/1093* (2023.01)

(52) U.S. Cl.
CPC ....... *G06Q 10/1095* (2013.01); *G06Q 50/167* (2013.01)

(58) Field of Classification Search
CPC ............. G06Q 10/1095; G06Q 50/167; G06Q 10/1093; G06Q 10/10; G06Q 10/109; G06Q 50/16
See application file for complete search history.

(56) References Cited

U.S. PATENT DOCUMENTS 5,014,049 A   5/1991   Bosley
5,245,652 A   9/1993   Larson et al.
(Continued)

OTHER PUBLICATIONS

A) Cao, J., Chan, J. Y., Li, H., Mahdjoubi, L., & Love, P. E. (2001). REALMEDIA: providing multimedia-based real-estate services through the Internet. Automation in construction, 10(2), 275-289 (Year: 2001).*

(Continued)

*Primary Examiner* — Carrie S Gilkey
(74) *Attorney, Agent, or Firm* — VLP Law Group LLP; James A. D. White

(57) ABSTRACT

A specialized server within a real estate showing management system creates a showing appointment for a showing agent to show a listing and a set of geo-fences around the listing when the appointment is created. At a particular time before the showing, the specialized server notifies a showing agent mobile device to download the set of geo-fences and, when requested, provides the set to the mobile device. The mobile device notifies the specialized server when it breaches a geo-fence within the set. When a showing agent is late for a showing appointment, the specialized server automatically reschedules a subsequent showing appointment by an adjusted rescheduling time. The subsequent showing appointment is for the same listing by a different showing agent or a different listing by the same showing agent. Notifications about the rescheduled subsequent showing appointment are also sent to parties.

12 Claims, 16 Drawing Sheets

(56) References Cited

U.S. PATENT DOCUMENTS

| | | | |
|---|---|---|---|
| 5,280,518 A | 1/1994 | Danler et al. | |
| 5,475,375 A | 12/1995 | Barrett et al. | |
| 5,612,683 A | 3/1997 | Trempala et al. | |
| 5,705,991 A | 1/1998 | Kniffin et al. | |
| 5,974,406 A | 10/1999 | Bisdikian et al. | |
| 6,101,480 A | 8/2000 | Conmy et al. | |
| 6,157,315 A | 12/2000 | Kokubo et al. | |
| 6,300,873 B1 | 10/2001 | Kucharczyk et al. | |
| 6,385,541 B1 | 5/2002 | Blumberg | |
| 6,496,776 B1 | 12/2002 | Blumberg | |
| 6,522,875 B1 | 2/2003 | Dowling et al. | |
| 6,594,633 B1 | 7/2003 | Broerman | |
| 6,624,742 B1 | 9/2003 | Romano et al. | |
| 6,636,803 B1 | 10/2003 | Hartz, Jr. et al. | |
| 6,727,801 B1 | 4/2004 | Gervasi et al. | |
| 6,842,105 B1 | 1/2005 | Henderson | |
| 6,973,432 B1 | 12/2005 | Woodard et al. | |
| 7,009,489 B2 | 3/2006 | Fisher | |
| 7,058,395 B2 | 6/2006 | Dowling et al. | |
| 7,127,475 B2 | 10/2006 | Gotz | |
| 7,191,058 B2 | 3/2007 | Laird et al. | |
| 7,193,503 B2 | 3/2007 | Fisher | |
| 7,292,844 B2 | 11/2007 | Dowling et al. | |
| 7,518,485 B2 | 4/2009 | Shuster | |
| 7,606,558 B2 | 10/2009 | Despain et al. | |
| 7,664,801 B2 | 2/2010 | Walker | |
| 7,728,711 B2 | 6/2010 | Shoenfeld | |
| 7,869,941 B2 * | 1/2011 | Coughlin | H04W 68/00 705/7.19 |
| 7,999,656 B2 | 8/2011 | Fisher | |
| 8,035,480 B2 | 10/2011 | Woodard et al. | |
| RE43,068 E | 1/2012 | Woodard et al. | |
| 8,145,352 B2 | 3/2012 | Woodard et al. | |
| 8,368,507 B2 | 2/2013 | Conreux | |
| 8,385,897 B1 | 2/2013 | Yadav-Ranjan | |
| 8,451,088 B2 | 5/2013 | Fisher | |
| 9,514,586 B2 | 12/2016 | Rogers et al. | |
| 9,659,334 B2 | 5/2017 | Fenn | |
| 9,916,742 B2 | 3/2018 | Kuenzi | |
| 10,713,740 B1 | 7/2020 | Caputo | |
| 2002/0022980 A1 | 2/2002 | Mozayeny et al. | |
| 2002/0174090 A1 | 11/2002 | Dexter | |
| 2003/0038708 A1 | 2/2003 | Lund | |
| 2003/0154573 A1 | 8/2003 | Gould | |
| 2003/0179075 A1 | 9/2003 | Greenman | |
| 2005/0149432 A1 | 7/2005 | Galey | |
| 2005/0168320 A1 | 8/2005 | Henderson et al. | |
| 2005/0192930 A1 | 9/2005 | Hightower et al. | |
| 2005/0288958 A1 | 12/2005 | Eraker et al. | |
| 2006/0106628 A1 | 5/2006 | Faherty et al. | |
| 2006/0220809 A1 | 10/2006 | Stigall et al. | |
| 2007/0100644 A1 | 5/2007 | Keillor et al. | |
| 2007/0143173 A1 | 6/2007 | Walker | |
| 2007/0266081 A1 | 11/2007 | Murchison | |
| 2007/0290798 A1 | 12/2007 | Larson et al. | |
| 2008/0168369 A1 | 7/2008 | Tadman | |
| 2008/0169937 A1 * | 7/2008 | Lowry | G06Q 30/06 705/1.1 |
| 2011/0053557 A1 | 3/2011 | Despain et al. | |
| 2011/0320372 A1 * | 12/2011 | Woodard | G06Q 50/16 705/313 |
| 2012/0290203 A1 | 11/2012 | King | |
| 2013/0005368 A1 | 1/2013 | Hunziker | |
| 2013/0262186 A1 | 10/2013 | Lazarre | |
| 2013/0282524 A1 | 10/2013 | Appolito et al. | |
| 2014/0258042 A1 | 9/2014 | Butler | |
| 2014/0304178 A1 | 10/2014 | Bengson | |
| 2015/0081327 A1 * | 3/2015 | Mooker | G06Q 10/1095 705/2 |
| 2016/0180620 A1 | 6/2016 | Eyring | |
| 2016/0275762 A1 * | 9/2016 | Kuenzi | G06Q 10/06 |
| 2016/0364928 A1 * | 12/2016 | Woodard | G06Q 10/1095 |
| 2018/0075681 A1 | 3/2018 | Scalisi | |
| 2019/0244455 A1 | 8/2019 | Kim | |
| 2019/0327448 A1 | 10/2019 | Fu | |

OTHER PUBLICATIONS

Marcus T. Allen et al., "Technology in Residential Brokerage: Showing Appointment Scheduling Services, Property Prices, and Marketing Times", Journal of Real Estate Practice and Education vol. 15 No. 1, 2012, 17 pages.

* cited by examiner

SYSTEM AND METHOD FOR MANAGING AND AUTOMATICALLY RESCHEDULING SHOWINGS OF REAL ESTATE LISTINGS BASED ON MULTIPLE FACTORS

CROSS-REFERENCE TO RELATED APPLICATIONS

This application is a continuation-in-part of co-pending U.S. patent application Ser. No. 17/078,941, entitled "SYSTEM AND METHOD FOR MANAGING REAL ESTATE LISTING SHOWINGS BASED ON MULTIPLE FACTORS," filed Oct. 23, 2020, assigned to ShowingTime.com, Inc. of Chicago, Ill., which is hereby incorporated by reference in its entirety, and which is a continuation application of co-pending U.S. patent application Ser. No. 16/020,733, entitled "SYSTEM AND METHOD FOR MANAGING SHOWINGS OF REAL ESTATE LISTINGS BASED ON MULTIPLE FACTORS," filed Jun. 27, 2018, assigned to ShowingTime.com, Inc. of Chicago, Ill.

FIELD OF THE DISCLOSURE

The present invention relates generally to a real estate showing management system and is particularly directed to a system and method for managing showings of real estate listings based on multiple factors. More particularly still, the present disclosure relates to a system and method for managing showing appointments and automatically rescheduling a subsequent showing appointment based on the real-time status of a previous showing.

DESCRIPTION OF BACKGROUND

A real estate showing management system manages and processes real estate property listings (also simply referred to herein as listings) and showings of listings. A listing is a real estate property that has been put up for sale, renting or leasing, for instance by a property owner. In the management system, a listing is a logical representation of a real estate property, and often comprises identification and contact information (such as a mobile telephone number and an Email address) of the owner and/or tenants and one or more listing agents of the underlying real estate property. The listing agents, co-listing agents, showing agents and owners are also collectively referred to herein as appointment contacts. Appointment contacts of a listing may include other interested parties, without limitation to, a co-owner, a listing office of the listing, a tenant of the underlying real estate property, a bank, a mortgage company, an appraiser or an inspector. Additionally, a listing includes a detailed description, such as an address and features, of the underlying real estate property. The listing may further include showing instructions and other details about the property, such as school information, tax information, marketing details.

A showing of a listing is a scheduled visit of the underlying real estate property by a showing agent (such as a real estate agent for a prospect buyer), the prospect buyer or another party (e.g., a professional inspector). A showing appointment (also referred to herein as an appointment) is a scheduled appointment that concerns or is regarding the showing of a listing. To schedule a showing, a showing agent, for instance, accesses a showing management system to request a showing appointment on a selected listing. The showing appointment is made on the calendar of an appointment contact (such as a listing agent, which is a real estate agent for the seller). Appointment contacts access the showing management system running a scheduling software application, such as ShowingTime®'s ShowingTime Appointment Center™ and ShowingTime Front Desk™ software, to manage their calendars. For example, a listing agent marks some time slots where he accepts showing appointments and indicates some other time slots where he does not accept showing appointments. Additionally, the showing management system allows a listing side contact (such as the listing agent, a co-listing agent, the seller, a tenant or an appointment manager) to indicate the procedure for the showings to be confirmed, such as no appointment required, confirmation by the seller required, etc.

After the showing appointment is requested, a request (through Email, telephone, text messaging, push notification, etc.) for confirmation is sent to the appointment contact. When the confirmation is received from the listing agent, the showing management system notifies the showing agent that his/her appointment has been confirmed or accepted. The showing appointment is stored in a database. It should be noted that the appointment contact may decline the showing request. In such a case, a decline is received from the listing agent. In addition, the showing agent is notified of the decline. The time of the scheduled showing is referred to herein as showing appointment time with a beginning time and an end time (or an ending time), such as 1:00 PM to 1:30 PM on Jun. 4, 2018. The showing appointment also indicates the listing and the showing agent. As used herein, a confirmed showing appointment is referred to as a confirmed showing appointment.

Usually, the showing agent accesses the property and shows the property to his client (such as a prospect buyer) at or around the showing appointment time. The showing agent visits the property, opens a lockbox attached to the property or an electronic door lock (collectively referred to herein as key controllers) to retrieve a physical key, and opens the property using the key for showing the property to a prospect buyer. After the showing, the showing agent closes the door of the property, places the key back into the key controller, and closes the key controller.

At the showing appointment time, the property may not be in the most attractive conditions to prospect buyers. For example, the temperature inside the property may be too low on a cold winter day or too high on a hot summer day. As another example, it is desirable to turn on music inside the property right before the showing. As an additional example, lights inside and/or outside of the property may be off or dim. As still a further example, the electronic door of the property may likely be locked. It is thus desirable for the showing management system to remotely operate the property facilities and accessories (such as a thermostat, lights, electronic doors, etc.) to put the property in a desirable condition as the showing appointment time approaches.

The remote operation of the property can be based on the beginning and ending times of a showing appointment. However, the actual start time and end time of the showing of the listing by the showing agent may be slightly different from the appointment time for various reasons. For example, the showing agent is late for the appointment; or the prospect buyer does not like the property at all and quickly ends the showing. Furthermore, the showing agent may show up at the property around showing appointment time.

The remote operation of the property can also be based on the breach of a geo-fence around the property by a mobile device (such as a smartphone) of the showing agent. However, the showing agent mobile device may not be aware of the geo-fence. Or, the system monitoring the geo-fence may not be integrated with the showing agent mobile device.

Furthermore, the showing agent may visit the property for purposes other than showing the property. Accordingly, there is a need for a showing management system that automatically operates the listing to improve the marketability of the listing with higher accuracy by considering multiple factors.

After the showing appointment time, the showing management system oftentimes sends a request (such as a text message, an Email, a voice call, etc.) to the showing agent seeking feedback on the listing or confirmation of end of the showing. Once the showing agent confirms, the showing management system then notifies an appointment contact (such as the property owner) that the showing has ended. This process is illustrated by reference to FIG. 10. At 1002, a server within the showing management system sends a request to the showing agent mobile device for confirming that the showing has concluded. At 1004, the server receives a confirmation from the showing agent mobile device. At 1006, the server sends a message (such as a text message, an Email, a voice call, a push notification, etc.) to an appointment contact mobile device indicating that the showing has ended.

However, the showing agent may not provide any feedback at all. Furthermore, the showing agent may not provide the feedback in a timely manner. In other words, the feedback may be provided a few hours after the feedback request is made. Accordingly, there is a need for a showing management system that automatically notifies an appointment contact of the conclusion of a showing without communication with a showing agent mobile device. There is a further need for a showing management system that automatically notifies an appointment contact of the conclusion of a showing without communication with a showing agent mobile device, but base on multiple factors.

For a particular showing appointment, the actual showing of the corresponding listing can be earlier or later than the showing appointment. In such a case, there is a need for a new showing appointment management system to automatically adjust one or more subsequent showing appointments of the same listing and/or one or more subsequent showing appointments of the same showing agent for other listings.

OBJECTS OF THE DISCLOSED SYSTEM, METHOD, AND APPARATUS

Accordingly, it is an object of this disclosure to provide a real estate showing management system that accurately determines the conclusion of a showing using multiple factors.

Another object of this disclosure is to provide a real estate showing management system that, after the conclusion of a showing, notifies an appointment contact without involvement of the showing agent of the showing.

Another object of this disclosure is to provide a real estate showing management system that accurately determines the conclusion of a showing using a showing appointment, a geo-fence and a lockbox.

Another object of this disclosure is to provide a real estate showing management system that accurately determines the conclusion of a showing using a showing appointment, a geo-fence and an electronic door lock.

Another object of this disclosure is to provide a real estate showing management system that accurately determines the start of a showing of a property using multiple factors.

Another object of this disclosure is to provide a real estate showing management system that accurately operates a remote property based on a showing appointment, a geo-fence and a lockbox.

Another object of this disclosure is to provide a real estate showing management system that accurately operates a remote property based on a showing using a showing appointment, a geo-fence and an electronic door lock.

Another object of this disclosure is to provide a real estate showing management system that automatically reschedules subsequent showing appointments based on the real-time showing status of a previous showing appointment.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides real estate showing management system. In accordance with the present teachings, the real estate showing management system includes a database storing and providing data and a specialized server having a processor, a specialized server software application running on the processor, a memory, and a network interface coupled to the processor and adaptively coupled to the database and a wide area network. The specialized server software application is adapted to receive a request for making a showing appointment of a listing for a showing agent. The showing agent is associated with a showing agent mobile device. The specialized server software application is also adapted to create the showing appointment, store the showing appointment into the database, and create a set of geo-fences around the listing. The set of geo-fences correspond to the showing appointment and include a first geo-fence. In addition, the specialized server software application is adapted to determine a geo-fence notification time to notify the showing agent mobile device of the set of geo-fences, and at the geo-fence notification time, sends a geo-fence notification to the showing agent mobile device. Moreover, the specialized server software application is adapted to receive a request from the showing agent mobile device for the set of geo-fences, provide the set of geo-fences to the showing agent mobile device, and receive a geo-fence breach notification from the showing agent mobile device after the showing agent mobile device has breached the first geo-fence. The geo-fence breach notification indicates a showing agent identifier of the showing agent. Furthermore, the specialized server software application is adapted to receive a key controller open notification from a key controller. The key controller is associated with the listing; and the key controller open notification indicates the showing agent identifier. The specialized server software application is also adapted to, based on the showing appointment, the geo-fence breach notification and a time of the geo-fence breach notification, determine that the showing agent should have access to the listing. The specialized server software application is further adapted to send an access code to a key controller associated with the listing and receive a key controller open notification from a key controller. The key controller open notification indicates the showing agent identifier. In addition, the specialized server software application is adapted to, based on the showing appointment, the geo-fence breach notification, the time of the geo-fence breach notification, the key controller open notification and a time of the key controller open notification, determine that the showing agent has started a showing of the listing corresponding to the showing appointment. The geo-fence notification is a push notification. The request is a geo-fence download request. The key controller is one of an electronic lockbox or an electronic door lock. The showing agent is determined to have started the showing corresponding to the showing appointment when the beginning time of the showing appointment, a time of the geo-fence breach notification, and a time of key controller open notification are within a predetermined time range.

Further in accordance with the present teachings is a real estate showing management system that automatically reschedules a subsequent showing appointment. The real estate showing management system includes a database storing and providing data, and a specialized server having a processor, a specialized server software application running on the processor, a memory, and a network interface coupled to the processor and adaptively coupled to the database and the Internet. The specialized server software application adapted to determine that a first showing agent has started showing a listing corresponding to a first showing appointment, the first showing appointment including a first beginning time and a first end time; determine that the first showing agent is late for the first showing appointment; determine a late amount of time for which the first showing agent is late for the first showing appointment; determine that a second showing agent has arrived at the listing for a second showing appointment for the listing while the first showing agent is still showing the listing corresponding to the first showing appointment, the second showing appointment including a second beginning time and a second end time and corresponding; determine that the listing does not allow overlapping showings; automatically reschedule the second showing appointment by an adjusted rescheduling time, thereby forming a rescheduled second showing appointment, wherein the adjusted rescheduling time is the late amount of time or a fixed amount of time; send a first notification to a first showing agent mobile device, associated with the first showing agent and adapted to communicate with the specialized server over the Internet, that another showing agent is waiting for showing the listing; and send a second notification to a second showing agent mobile device associated with the second showing agent and adapted to communicate with the specialized server over the Internet, the second notification indicating the rescheduled second showing appointment.

Further in accordance with the present teachings is a real estate showing management system that automatically reschedules a subsequent showing appointment. The real estate showing management system includes a database storing and providing data; and a specialized server having a processor, a specialized server software application running on the processor, a memory, and a network interface coupled to the processor and adaptively coupled to the database and the Internet. The specialized server software application adapted to determine that a showing agent has started a first showing of a first listing corresponding to a first showing appointment, the first showing appointment including a first beginning time and a first end time; determine that the showing agent is late for the first showing appointment; determine a late amount of time for which the showing agent is late for the first showing appointment; determine that the showing agent has a second confirmed showing appointment for showing a second listing after the first showing appointment on a same day, the second showing appointment including a second beginning time and a second end time; determine an ending time of the first showing; determine an estimated travel time from the first listing to the second listing; determine an estimated arrival time of the showing agent to the second listing after the first showing; when the estimated arrival time is after the second beginning time, automatically reschedule the second showing appointment by an adjusted rescheduling time, thereby forming a rescheduled second showing appointment, wherein the adjusted rescheduling time is the late amount of time or a fixed amount of time; and send a first notification to a showing agent mobile device, associated with the showing agent and adapted to communicate with the specialized server over the Internet, indicating the rescheduled second showing appointment.

Further in accordance with the present teachings is a method for automatically rescheduling showings based on multiple factors. The method is performed within a real estate showing management system and includes determining that a first showing agent has started showing a listing corresponding to a first showing appointment by a specialized server software application running on a processor of a specialized server within the real estate showing management system. The first showing appointment includes a first beginning time and a first end time. The specialized server has the processor, a memory operatively coupled to the processor, and a network interface operatively coupled to the processor and adaptively coupled to the database and the Internet. The method further includes determining that the first showing agent is late for the first showing appointment; determining a late amount of time for which the first showing agent is late for the first showing appointment; determining that a second showing agent has arrived at the listing for a second showing appointment for the listing while the first showing agent is still showing the listing corresponding to the first showing appointment, the second showing appointment including a second beginning time and a second end time and corresponding; determining that the listing does not allow overlapping showings; automatically rescheduling the second showing appointment by an adjusted rescheduling time, thereby forming a rescheduled second showing appointment: sending a first notification to a first showing agent mobile device, which is associated with the first showing agent and adapted to communicate with the specialized server over the Internet, that another showing agent is waiting for showing the listing; and sending a second notification to a second showing agent mobile device associated with the second showing agent and adapted to communicate with the specialized server over the Internet. The second notification indicates the rescheduled second showing appointment.

The method further includes receiving a request for making the first showing appointment of the listing for the first showing agent associated with a first showing agent mobile device adapted to communicate with the specialized server over the Internet; creating the first showing appointment; creating a first set of geo-fences that includes a first geo-fence around the listing; determining a geo-fence notification time to notify the first showing agent mobile device of the set of geo-fences; at the geo-fence notification time, sending a geo-fence notification to the first showing agent mobile device; receiving a request from the first showing agent mobile device for the first set of geo-fences; providing the first set of geo-fences to the first showing agent mobile device; receiving a geo-fence breach notification from the first showing agent mobile device after the first showing agent mobile device has breached the first geo-fence, wherein the geo-fence breach notification indicates a showing agent identifier of the first showing agent; based on the first showing appointment, the geo-fence breach notification and a time of the geo-fence breach notification, determining that the first showing agent should have access to the listing; sending an access code for accessing a key controller associated with the listing to the first showing agent mobile device; receiving a key controller open notification from a key controller, wherein the key controller open notification indicates the first showing agent identifier; and based on the first showing appointment, the geo-fence breach notification, the time of the geo-fence breach notification, the key controller open notification and a time of the key controller open notification, determining that the first showing agent has started showing the listing.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1A:
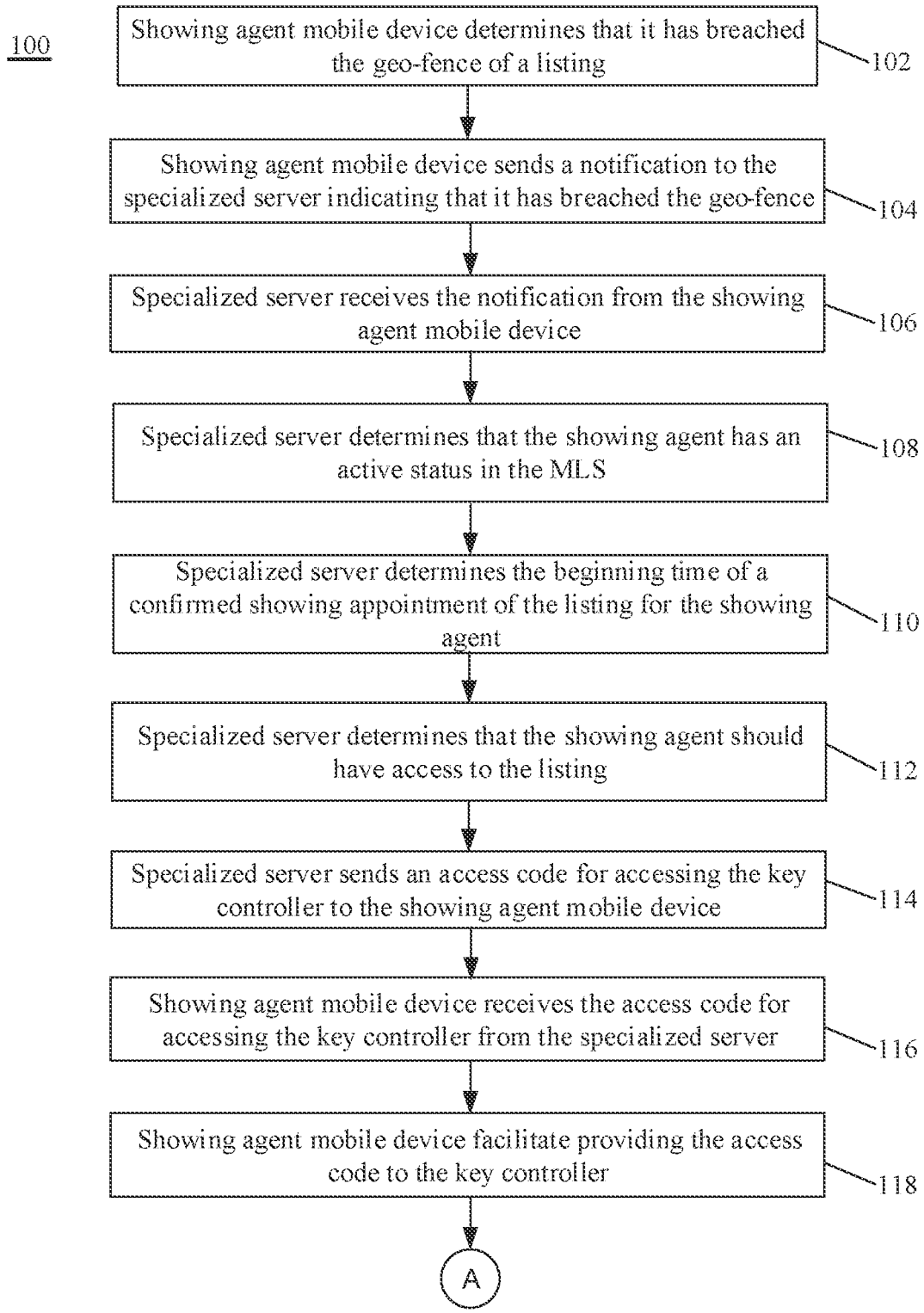
FIG. 1A is a flowchart depicting a process by which the beginning of a showing of a listing is determined based on multiple factors in accordance with the teachings of this disclosure.
Figure 1B:
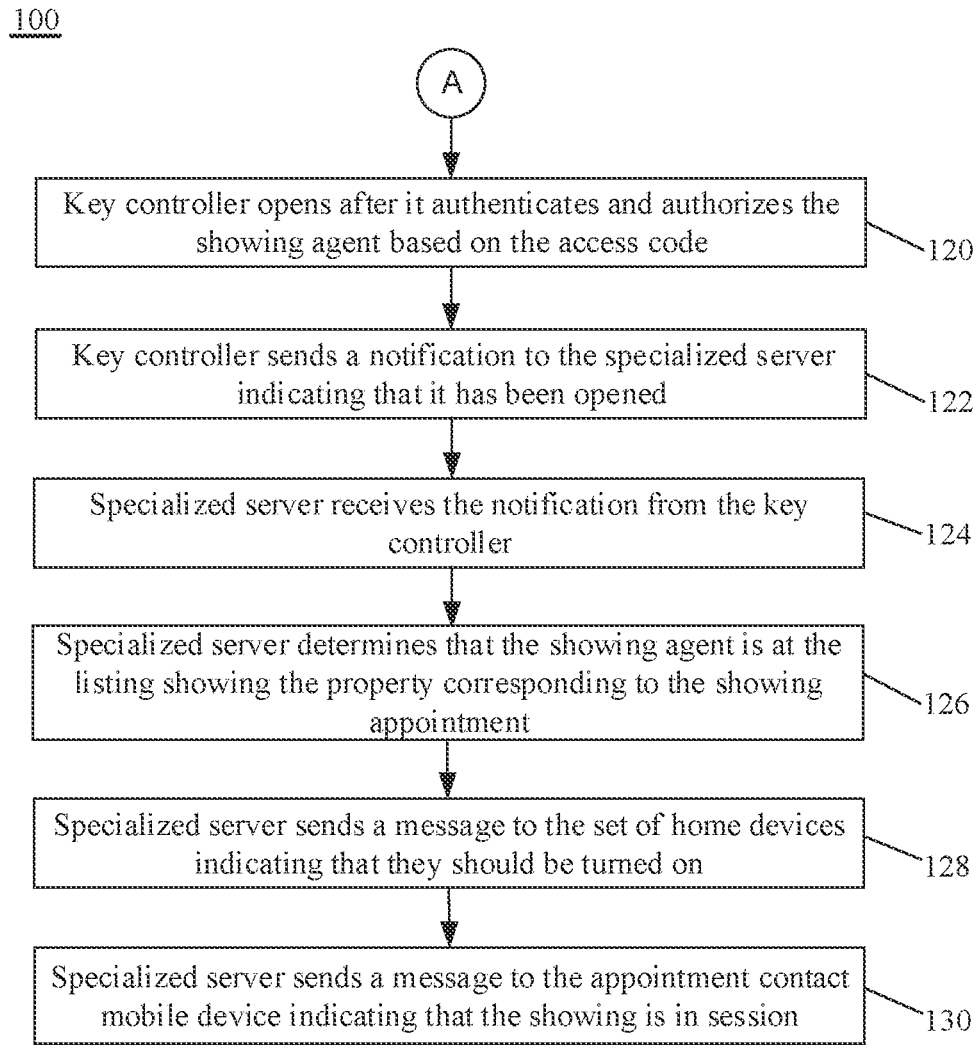
FIG. 1B is a flowchart depicting a process by which the beginning of a showing of a listing is determined based on multiple factors in accordance with the teachings of this disclosure.

Turning to the Figures and to FIGS. 1A and 1B in particular, a flowchart depicting a process by which a specialized server within a real estate showing management system determines that a showing agent is at a listing for showing the listing using multiple factors, and automatically operates the remote property is shown and generally indicated at 100. The specialized server and the real estate showing management system are further illustrated by reference to FIG. 5.

Figure 5:
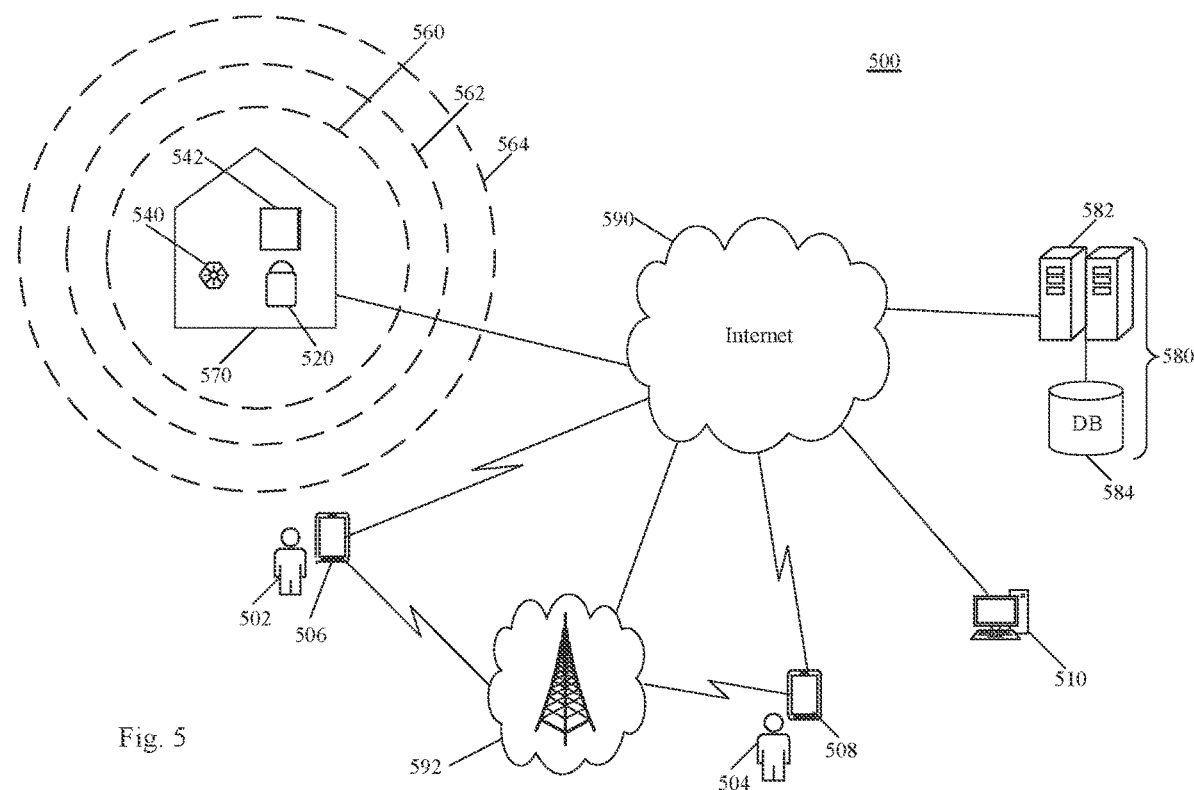
FIG. 5 is a simplified diagram depicting a communication system for managing real estate showings in accordance with the teachings of this disclosure.

Turning to FIG. 5, a simplified block diagram of a communication is shown and indicated at 500. The communication system 500 includes the Internet 590, a public cellular network 592, a real estate showing management system 580, a computer 510 (such as a laptop, a desktop, a smart phone) for accessing the system 580 to schedule a showing appoint for showing a property 570, a showing agent mobile device 506 operated by a showing agent 502, an appointment contact mobile device 508 operated by an appointment contact 504, a key controller 520 attached to or located close to the property 570, and a set of property electronic devices indicated at 540 and 542. The mobile devices (such as smartphones) 506-508 communicate with the system 580 over the Internet. The mobile devices 506-508 access the Internet via the cellular network 592, Wi-Fi routers, or other links. The showing agent 502 or a different person operates the computer 510 to access the system 580 over the Internet 590 for making a showing appointment for the showing agent 502 to show the listing 570 to a prospect buyer.

The real estate showing management system 580 includes a database 584 and one or more specialized servers 582. The database 584 stores appointment contacts, listings, showing appointments, and other real estate related data. The databases 584, such as relational databases, are operatively coupled to the specialized servers 582. The specialized servers 582 run a specialized server software application (comprising one or more computer programs) for scheduling showings, managing listings, performing processes disclosed herein and performing other tasks. The specialized server software application is physically housed in a single server or distributed across multiple servers within the system 580. Moreover, the system 580 may also integrates with or connects to one or more listing services (not shown) to update the database 584 of real estate property listings. In accordance with the present teachings, each specialized server 582 includes a processor, a network interface through which the server 582 accesses the Internet 590, and some amount of memory. The specialized server software application is executed by the processor to carry out new features disclosed herein and thus makes the servers 582 specialized servers.

The key controller 520, such as an electronic lockbox, is attached to the property 570. The showing agent 502 opens the key controller 520 to retrieve a key for opening the property 570. When the showing agent 502 ends her/his showing of the listing 570, she/he places the key back into the lockbox 520 and closes the lockbox 520. When the lockbox 520 is opened or closed, it sends a notification to a server system, such as a lockbox management system. The notification is also provided to the servers 582, either directly from the lockbox 520 or indirectly from the lockbox management system. As used herein, it is said that the notification from the lockbox 520 is sent to the specialized server 582. The notification further indicates the identifier of the showing agent 502 who opens and/or closes the lockbox 520, and the time of the opening or closing of it.

Alternatively, the key controller 520 is an electronic door lock attached to the property 570. The electronic door lock also sends a notification to the server 582 when it is opened and closed. The notification is a message indicates the identifier of the showing agent 502 who opens and/or closes the electronic door lock 520, and the time when the key controller 520 is opened or closed. As used herein, the key controller 520 is said to be associated with the listing 570.

Figure 6:
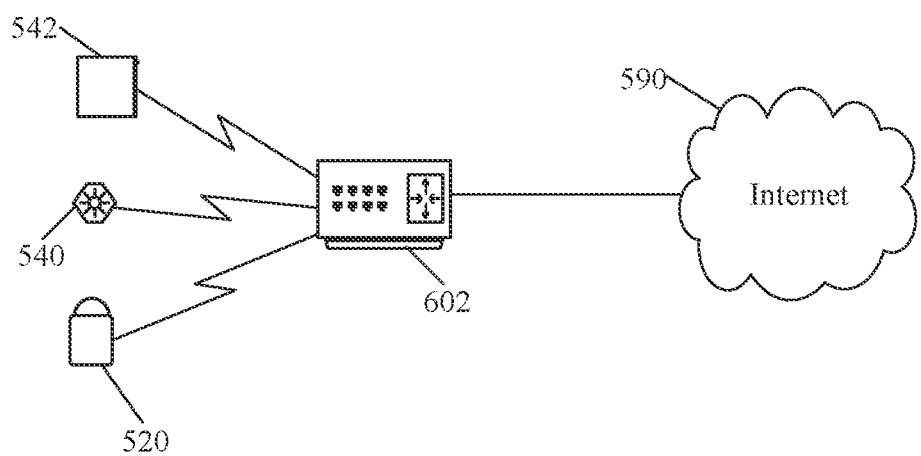
FIG. 6 is a simplified diagram depicting a communication system with property electronic devices communicating with the Internet via a central communication device in accordance with the teachings of this disclosure.

Inside the property 570, there are a set of property electronic devices, such as a lighting system, a refrigerator, a fireplace controller, a camera system, a thermostat, a sound system and other types of electronic systems and devices, collectively indicated at 540-542. The property electronic devices 540-542 are operatively coupled to the Internet 590 and thus remotely accessible by the specialized server software application. The property electronic devices 540-542 accesses the Internet 590 either directly or through a central controlling device. The latter case is illustrated in FIG. 6.

The property electronic devices 540-542 accesses the Internet 590 via a central communication device (such as a computer running a specialized software application) 602. The central communication device 602 can also be a wireless router for accessing the Internet 590. In such a case, the wireless router 602 runs a specialized computer program that bridges the communication between the property electronic devices 540-542 and the specialized servers 582.

A set of geo-fences around the listing 570 are indicated at 560, 562, 564. The set of geo-fences includes one or more geo-fences. Each geo-fence is a virtual geographic boundary, such as a circle, defined using global positioning system ("GPS") or radio frequency identification ("RFID") technological data. In one implementation in accordance with the present teachings, the set of geo-fences is created when the corresponding showing appointment is created. The creation and management of the set of geo-fences is further illustrated by reference to FIGS. 7 and 8.

Figure 7:
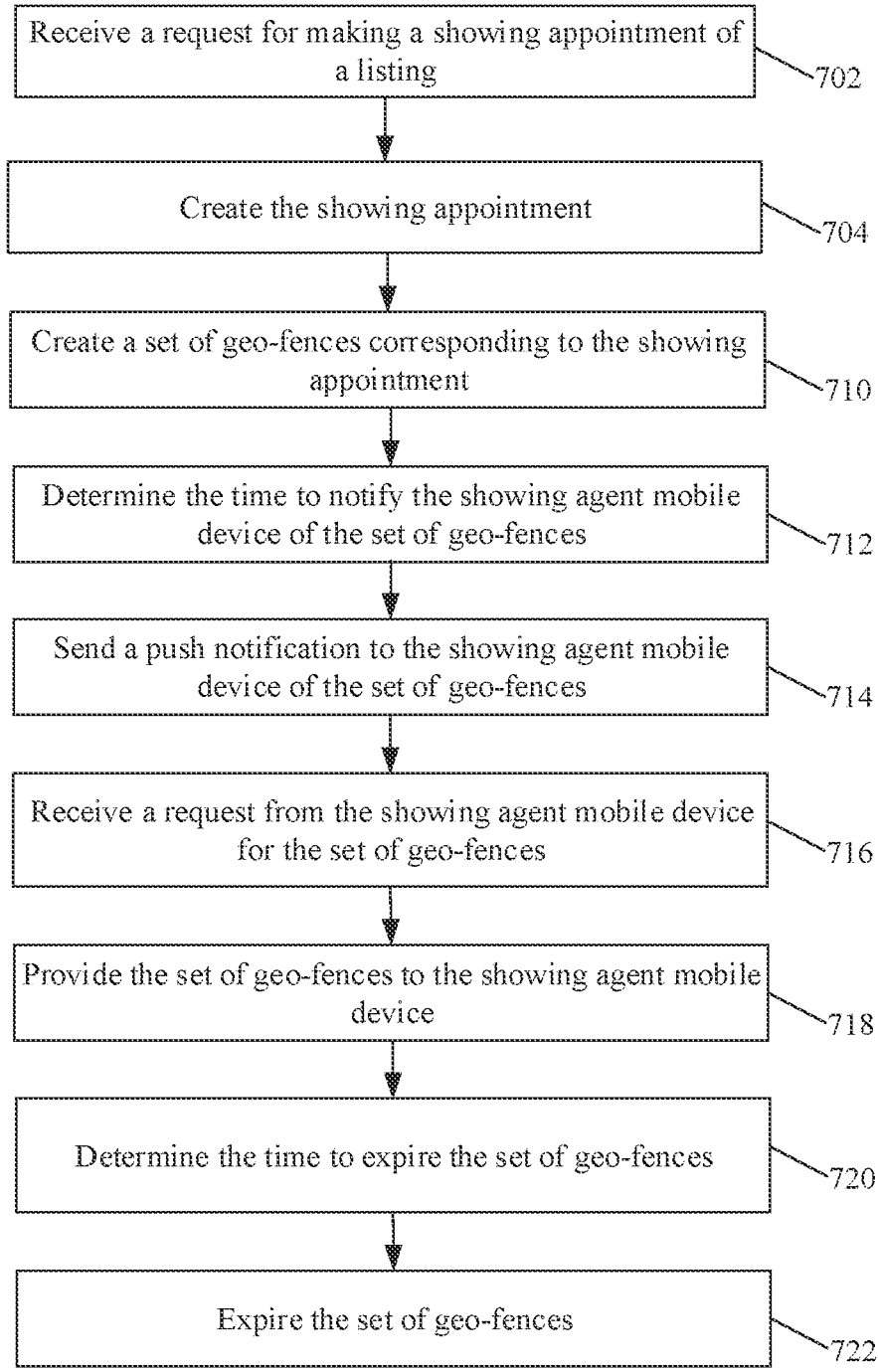
FIG. 7 is a flowchart depicting a process by which a specialized server within a real estate showing management system manages showing appointments and geo-fences in accordance with the teachings of this disclosure.

Referring first to FIG. 7, a flowchart depicting a process by which the specialized server 582 creates and manages the set of geo-fences is shown and generally indicated at 700. At 702, the specialized server software application running on the server 582 receives a request for scheduling a showing appointment of the listing 570. For instance, this request is received from the computer 510; and the showing appointment is for the showing agent 502 to show the listing 570 to a customer. At 704, the specialized server software application creates the showing appointment and stores it into the database 584. At 710, the specialized server software application creates a set of geo-fences around the listing 570, such as the geo-fences 560-564. The set of geo-fences differ in size. It is created for the date of the showing appointment time, and stored into the database 584. The set of geo-fences is created in response to the making of the showing appointment.

At 712, the specialized server software application determines the time to notify the showing agent mobile device 506 of the set of geo-fences. In one implementation, one hour before the beginning time of the showing appointment is determined to be the time to send the set of geo-fences to the mobile device 506. At 714, the specialized server software application sends a notification message, such as a push notification, to the showing agent mobile device 506 indicating that the set of geo-fences should be downloaded now. In response, a specialized mobile software application running on the showing agent mobile device 506 sends a download request to the specialized server 582. Thereafter, at 716, the specialized server software application receives the download request. In response, at 718, the specialized server software application provides the set of geo-fences to the mobile device 506.

At 720, the specialized server software application determines the time to expire the set of geo-fences. For example, the time to expire the set of geo-fences is the end of the day of the showing appointment. At 722, at the determined time, the specialized server software application expires the set of geo-fences. In other words, the set of geo-fences is marked as in-active or deleted. The process by which the showing agent mobile device 506 retrieves the set of geo-fences is illustrated in FIG. 8.

Figure 8:
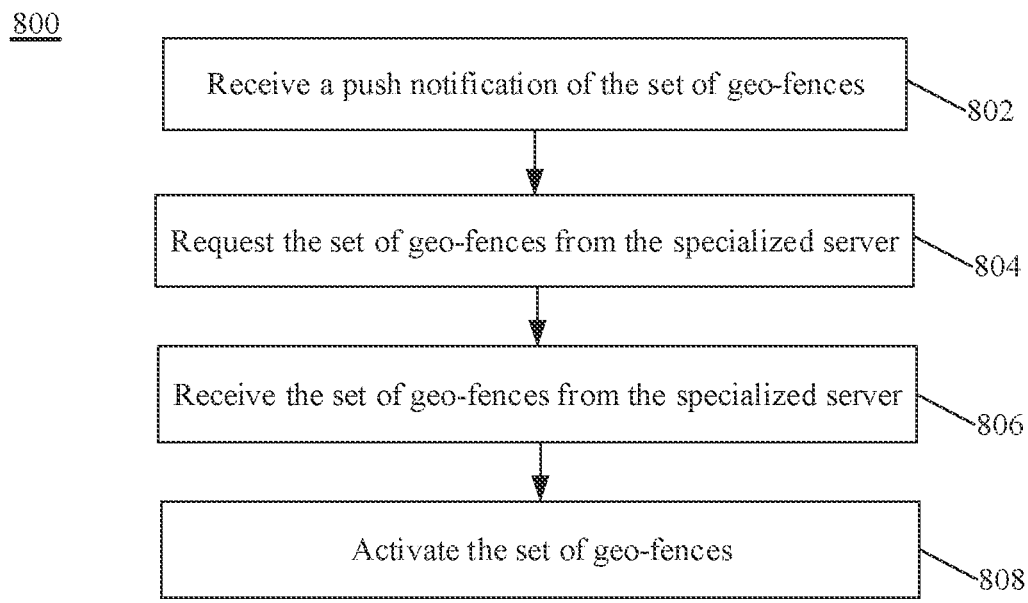
FIG. 8 is a flowchart by which a showing agent mobile device manages geo-fences in accordance with the teachings of this disclosure.

Referring to FIG. 8, a flowchart depicting a process by which a showing agent mobile device retrieves a set of geo-fences is shown and generally indicated at 800. At 802, the specialized mobile software application running on the showing agent mobile device 506 receives the push notification for the set of geo-fences from the specialized server 582. At 804, the specialized mobile software application sends a request to the specialized server 582 for the set of geo-fences. At 806, the specialized mobile software application receives the set of geo-fences from the specialized server 582. At 808, the specialized mobile software application activates the set of geo-fences.

When it is time for the showing agent 502, she/he visits the property 570 carrying the mobile device 506. When the showing agent mobile device 506 goes into the virtual boundaries defined by the set of geo-fences, i.e., breaching the geo-fences, the specialized mobile software application detects the breach or is notified by the breach. In such a case, as used herein, the mobile device 506 is said to have detected the breach.

Returning to FIG. 1A, at 102, the specialized mobile software application determines that one of the geo-fences, such as the smallest geo-fence 560, within the set has been breached. At 104, the specialized mobile software application sends a message to the specialized server software application running on the server 582. The message notifies the server 582 that the showing agent mobile device 506 and the showing agent 502 are at the property 570 at the time of the message because they have breached the geo-fence 560. The notification message also indicates an identifier of the showing agent 502.

At 106, the specialized server software application receives the notification from the mobile device 506. At 108, the specialized server software application determines a member status of the showing agent 502 within the Multiple Listing Service ("MLS"). For instance, the showing agent 502 has to be to an active member of the MLS. At 110, the specialized server software application determines that the beginning time of a confirmed showing appointment of the listing 570 for the showing agent 502. For example, the specialized server software application queries the database 584 to retrieve multiple showing appointments, including the showing appointment by the showing agent 502 of the property 570 around the time of the notification. For instance, all showing appointments of the showing agent 502 on the same day or within four hours of the notification are retrieved. At 112, the specialized server software application determines that the showing agent 502 is at the listing 570 at the time of the showing appointment. For example, when the beginning time of the showing appointment and the time of the notification from the mobile device 506 are within a predetermined range of time (such as fifteen minutes or twenty minutes), the showing agent 502 is said to be at the property 570 at the time of the showing appointment and should have access to the listing 570. At 114, the specialized server software application sends an access code to the key controller 520 to the showing agent mobile device 506.

At 116, the specialized mobile software application receives the access code. At 118, the specialized mobile software application facilitates providing the access code to the key controller for authentication. For example, the specialized mobile software application displays the access code on a screen of the showing agent mobile device 506. The showing agent 502 then enters it into the key controller 520. For instance, when the key controller 520 is a mechanical lockbox without network connection capabilities, the access code needs to be manually entered to the key controller 520 by the showing agent 502. As another example, the specialized mobile software application displays a button. When the button is pressed by the showing agent 502, the specialized mobile software application then sends the access code to the key controller 520 over a wireless link (such as a BlueTooth link, a Wi-Fi link, etc.).

At 120, the key controller 520 receives the access code and opens when the showing agent 502 is authenticated and authorized. The key controller 520 may also receive other access information from the showing agent mobile device 506, such as the showing agent's identifier and the showing appointment data. When the access is authenticated and/or authorized, the key controller 520 opens and logs the access indicating the type of access (i.e., opening), an identifier of the showing agent 502, the time of access, the identification of the key controller, etc. At 122, the key controller 520 sends a message to the server 582 indicating that the key controller 520 has been opened by the showing agent 502. The message indicates an identifier of the listing 570 directly or indirectly. At 124, the specialized server software application receives the notification from the key controller 520. At 126, the specialized mobile software application determines that the showing agent 506 is at the listing 570 showing the property corresponding to the showing appointment based on the key controller notification, the time of the notification, the showing appointment, the geo-fence breach notification and the time of the geo-fence breach notification.

When the key controller 520 is a mechanical lockbox, it does not have network (such as the Internet) connection capabilities. In such a case, the element 122 is not performed; and, at 126, the specialized server software application determines that the showing agent 506 is at the listing 570 showing the property corresponding to the showing appointment based on the showing appointment, the geo-fence breach notification and the time of the geo-fence breach notification. In other words, at 126, the specialized server software application determines that the showing has started based on the showing appointment, the geo-fence breach notification and the time of the geo-fence breach notification. Alternatively, at 126, the specialized server software application determines that the showing has started based on a notification from the showing agent mobile device 506. This process is further illustrated by reference to FIG. 11.

Figure 11:
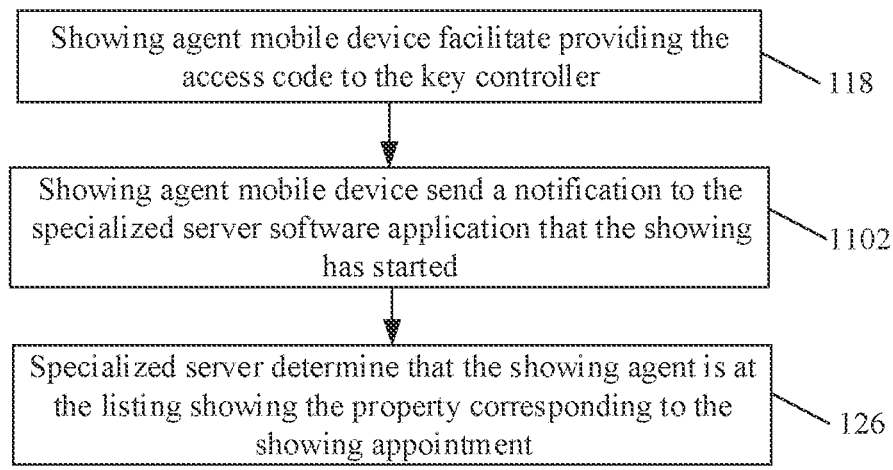
FIG. 11 is a flowchart by which a showing appointment management system determines that a showing has started in accordance with the teachings of this disclosure.

Referring now to FIG. 11, a flowchart illustrating a process by which the specialized server software application determines that a showing has started is shown and generally indicated at 1100. After the showing agent mobile device 506 facilitates providing the access code to the key controller 520, at 1102, the mobile software application sends a notification message to the specialized server software application that the showing has started. Based on the showing starting notification, at 126, the specialized server software application determines that the showing agent is at the listing showing the property corresponding to the showing appointment, and the showing has started.

At 128, the specialized server software application communicates with the property electronic devices 540-542 indicating that they should turn themselves on or set to a predetermined configuration. For example, a sound system, a lighting system, and a fireplace (or an air conditioner) turn themselves on to increase the marketability of the property. As another example, a smart thermostat sets the room temperature to a predetermined level. The predetermined level keeps the property warm in winter and cool in summer. It should be noted that property electronic devices can be remotely operated via a controller device, such as a thermostat for controlling the temperature inside the property 570. In such a case, the specialized server 582 communicates with the remote controller devices, such as the thermostat. In a further implementation, at 130, the specialized server software application sends a message to appointment contact mobile devices, such as the device 508, indicating that the showing corresponding to the showing appointment is in session.

In the process 100, the specialized server 582 determines that a showing corresponding to a showing appointment has started using multiple factors. The factors include the showing appointment, the geo-fence and the breach of the geo-fence, and the access to the key controller. Using the three factors significantly improves the accuracy of the determination that the showing agent is showing the property 570 now. For example, solely relying the showing appointment's beginning time to determine that the showing agent 502 is showing the property 570 is not reliable. One reason is that the showing agent 502 may be late or early for the showing appointment. Another reason is that the showing agent 502 may forget about the showing appointment. As another example, relying on the showing appointment and the geo-fence breach, but not key controller access, to determine that the showing agent 502 is showing the property 570 may not be accurate. For instance, the showing agent 502 may be at the property 570 waiting for her/his client to show up for the showing.

Figure 2:
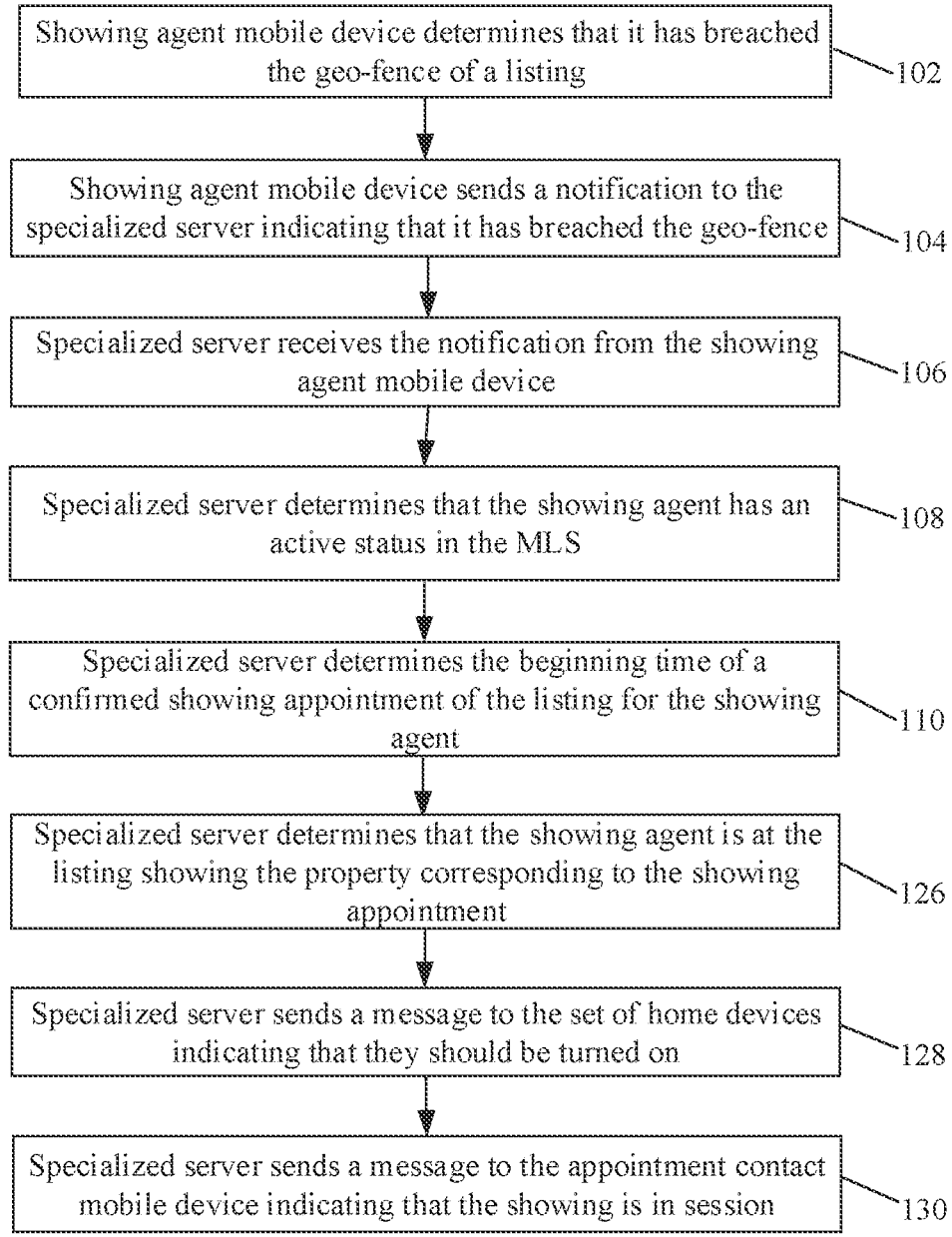
FIG. 2 is a flowchart depicting a process by which the beginning of a showing of a listing is determined based on multiple factors in accordance with the teachings of this disclosure.

However, relying on the showing appointment and the geo-fence breach to determine that the showing agent 502 is showing the property 570 is still more accurate than conventional approaches because both the showing appointment and the geo-fence are considered in making the determination. The process by which the specialized server software application determines that the showing agent 502 is showing the property 570 corresponding to the showing appointment is shown in FIG. 2 and generally indicated at 200.

Figure 3:
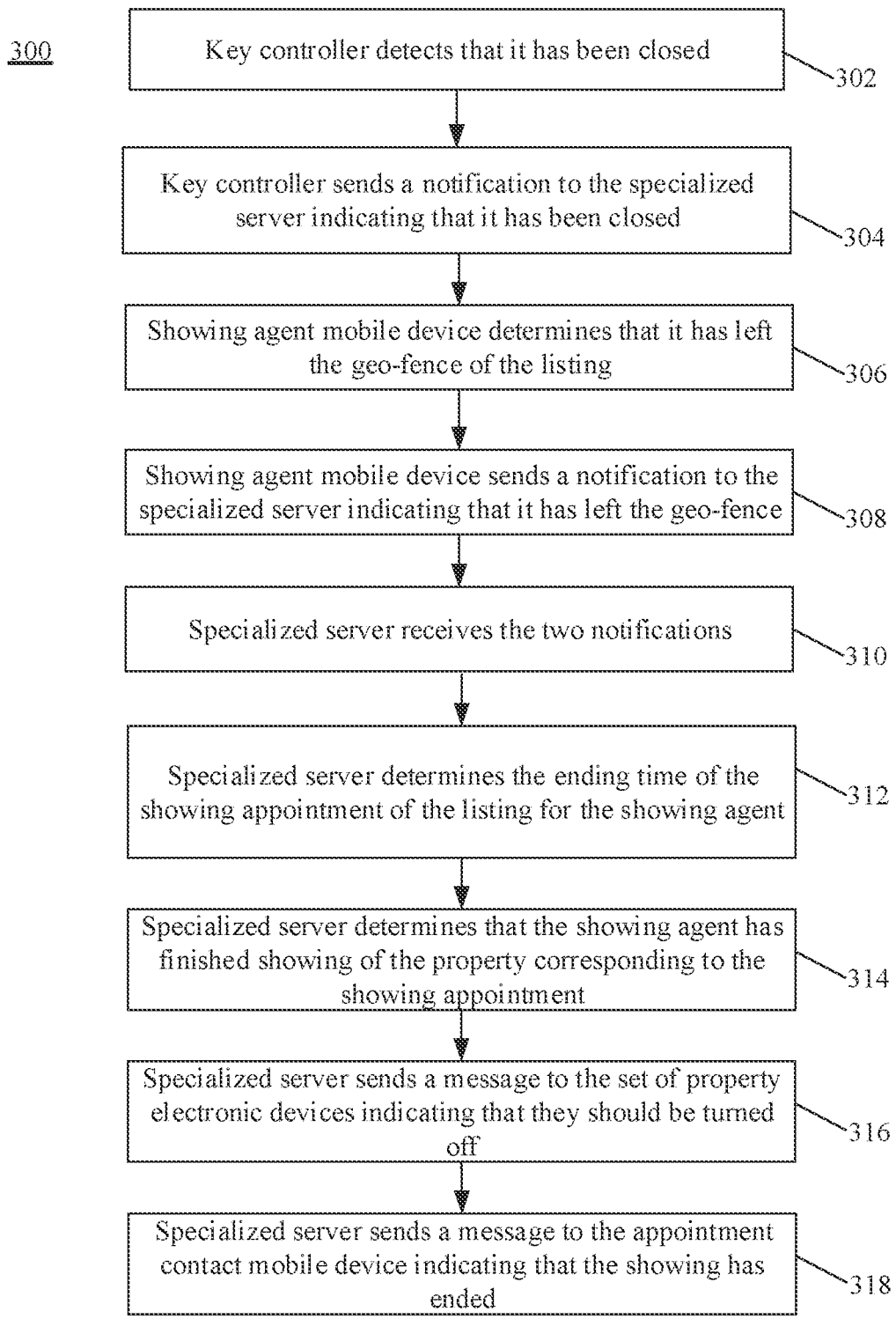
FIG. 3 is a flowchart depicting a process by which a notification of the conclusion of a showing of a listing is automatically provided based on multiple factors in accordance with the teachings of this disclosure.

When the showing is completed, the specialized server software application also uses the showing appointment, the geo-fence and the key controller access to determine that the showing agent 502 has concluded her/his showing of the property 570 corresponding to the showing appointment. This process is further illustrated in FIG. 3 and generally indicated at 300.

The showing agent 502 usually closes and locks the door of the property 570 after the showing. She/he then places the key back into the key controller and closes the key controller. At 302, the key controller 520 detects that it has been closed. At 304, the key controller 520 sends notification message to the specialized server software application indicating that it has been closed. At 306, the specialized mobile software application determines that the mobile device has left the geo-fence 560. At 308, the specialized mobile software application sends a message to the specialized server software application indicating that it has left the geo-fence 560. It means that the showing agent 502 has left the geo-fence 560 and the listing 570. The notification message also indicates an identifier of the showing agent 502.

At 310, the specialized server software application receives the two notifications from the key controller 520 and the device 506 respectively. Reception of the two notification messages can occur at close, but different time. At 312, the specialized server software application determines the ending time of the showing appointment. For example, it checks the showing appointment data record and retrieves the ending time. At 314, the specialized server software application determines that the showing corresponding to the showing appointment has ended. For instance, when the reception time of the notification from the device 506, the reception time of the notification from the key controller 520, and the ending time of the showing appointment are within a predetermined range of time (such as ten or thirty minutes), the specialized server software application regards the showing as have been concluded. When the key controller 520 is a mechanical lockbox that lacks the capability to connect to the Internet 590, the element 304 is not performed. In such a case, 314, the specialized server software application determines that the showing corresponding to the showing appointment has ended when the reception time of the notification from the device 506, and the ending time of the showing appointment are within a predetermined range of time. Alternatively, when the showing is over, the showing agent 502 operates the mobile software application running on the device 506 to send the specialized server software application a showing ended notification over the Internet 590. In response, at 316, the specialized server software application sends a message to the set of property electronic devices (such as 540-542) indicating that they should be turned off or set to a predetermined configuration since the showing has ended.

In a further implementation, at 316, the specialized server software application determines whether the showing appointment is the last showing appointment scheduled for the day of the showing appointment. If so, at 316, the specialized server software application sends a message to the set of property electronic devices (such as 540-542) indicating that they should be turned off or set to a predetermined configuration since the showing of the last appointment has ended. For instance, in such a case, the specialized server software application sends a message a smart thermostat to set the room temperature to a predetermined level, which can be set of the property owner. To determine whether the showing appointment is the last showing appointment scheduled for the day of the showing appointment of the listing 570, the specialized server software application may first access the database 584 to retrieve all showing appointments scheduled for the listing 570 on this day, and then check whether the present showing appointment is the last one.

At 318, the specialized server software application sends a message to the appointment contact mobile device 508 indicating that the showing has ended. Therefore, the appointment contact 504 (such as a home owner) can return to the property 570. This appointment contact notification is sent without seeking confirmation from the showing agent 502 that the showing has ended. Such confirmation is not reliable since showing agents oftentimes do not respond to such inquiries. Even when they respond, their responses may well not be timely. The process 300 allows the specialized server 582 to accurately and timely determine that a showing has concluded because it relies on multiple factors, such as the showing appointment, the geo-fence and the key controller access.

Figure 4:
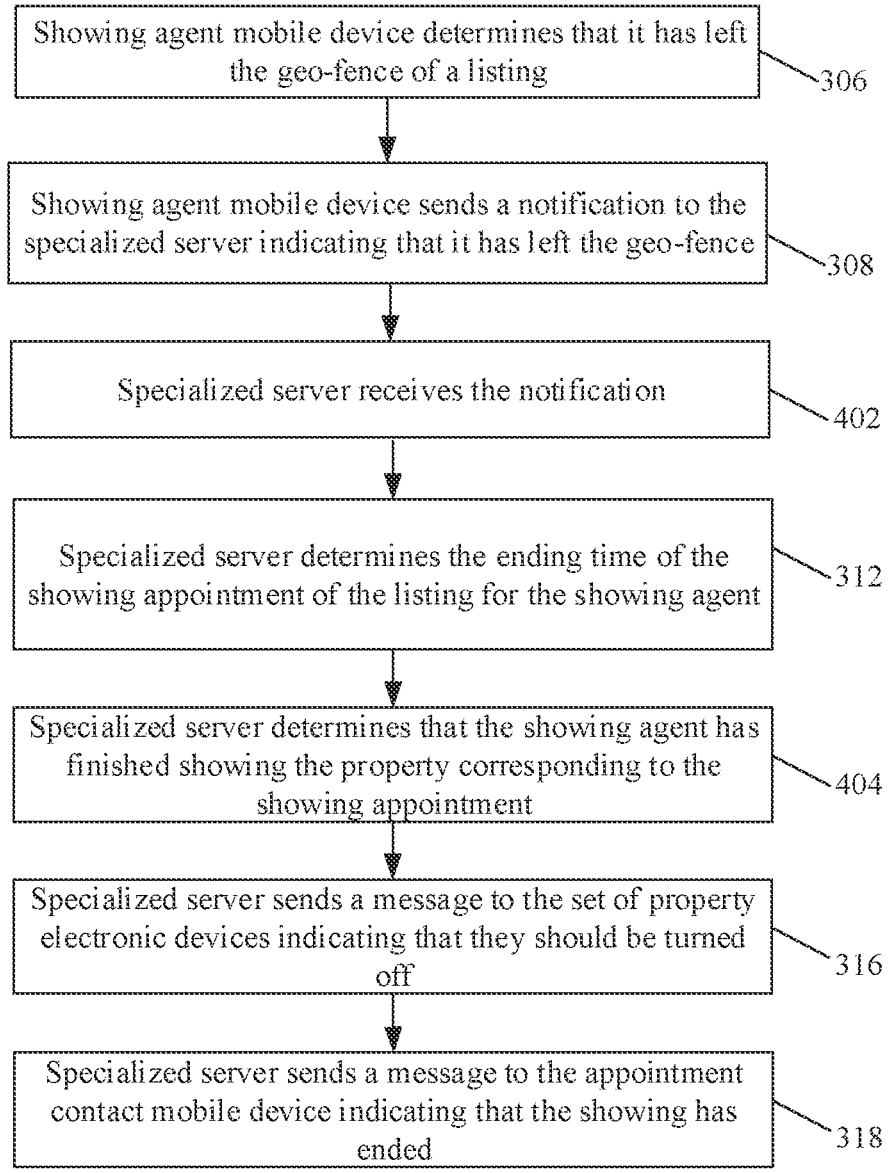
FIG. 4 is a flowchart depicting a process by which a notification of the conclusion of a showing of a listing is automatically provided based on multiple factors in accordance with the teachings of this disclosure.

Referring to FIG. 4, a flowchart depicting a process by which the specialized server software application determines that a showing corresponding to a showing appointment has ended based on the showing appointment and the geo-fence data. At 402, the specialized server software application receives the notification from the showing agent mobile device 506. At 404, the specialized server software application determines that the showing corresponding to the showing appointment has concluded based on the ending time of the showing appointment and the notification. For example, when the time of the notification and the ending time are within a predetermined range of time (such as ten or twenty-five minutes), the specialized server software application regards the showing as has been concluded.

Figure 9:
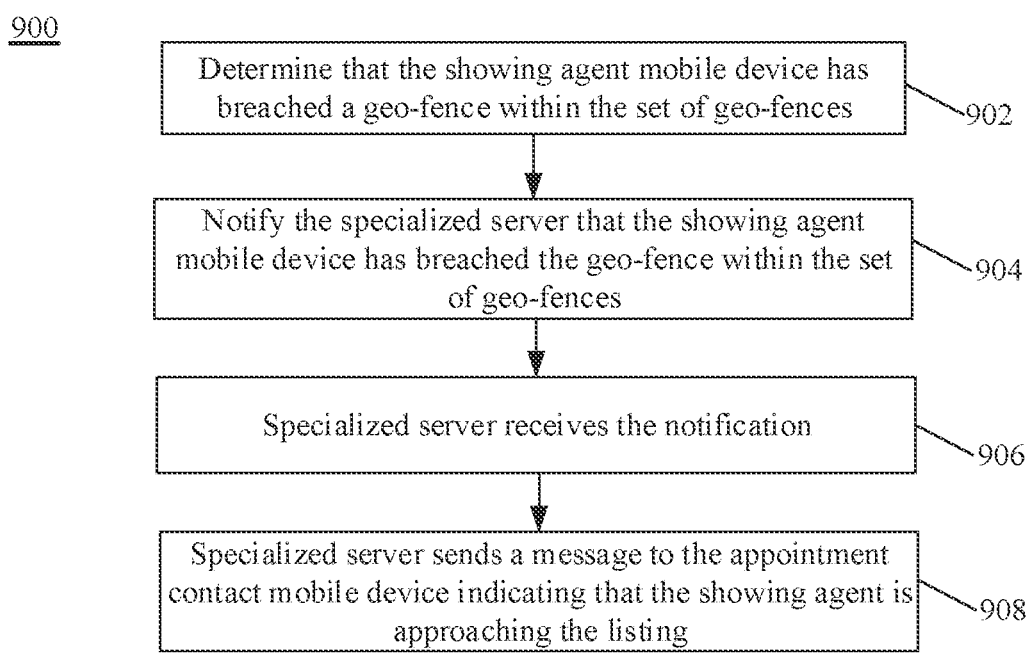
FIG. 9 is a flowchart depicting a process by which a specialized server within a real estate showing management system communicates with an appointment contact communication device with a showing agent mobile device breaches a first geo-fence in accordance with the teachings of this disclosure.
Figure 10:
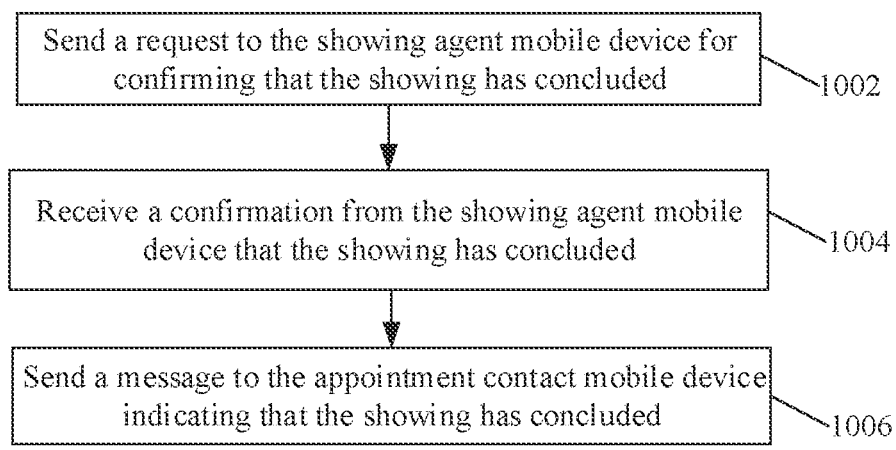
FIG. 10 is a flowchart by which a prior art real estate showing management system notifies an appointment contact of the conclusion of a showing of a listing.

The set of geo-fences 560-564 are also provided for reminding appointment contacts, which is further illustrated by reference to FIG. 9. Referring to FIG. 9, a flowchart depicting a process by which the specialized server reminds the appointment contact 504 that the showing agent 502 is approaching the listing 570 for showing is shown and generally indicated at 900. At 902, the specialized mobile software application running on the device 506 determines that the device 506 has breached the geo-fence 564. The outer geo-fence 564 has a larger radius, such as one thousand meters. At 904, the specialized mobile software application sends a message to the specialized server software application indicating that the device 506 has breached the geo-fence 564.

At 906, the specialized server software application receives the notification message. In response, at 906, the specialized server software application sends a message to the appointment contact mobile device 508 that the showing agent 502 is approaching the property 570. The message can be a push-notification, an Email message, a phone call, etc. The reminding message allows the appointment contact 504 to prepare for the showing. For example, the appointment contact 504 can leave the property 570, turn on a lighting system, turn on a sound system, turn on a fireplace, etc. Since the reminder is usually minutes before the arrival of the showing agent 502 with a prospect buyer, the appointment contact 504 does not have to leave to property 570 too early before the showing. Furthermore, the appointment contact 504 does not have to perform certain activities (such as turning a sound system) too early before the showing.

Figure 12:
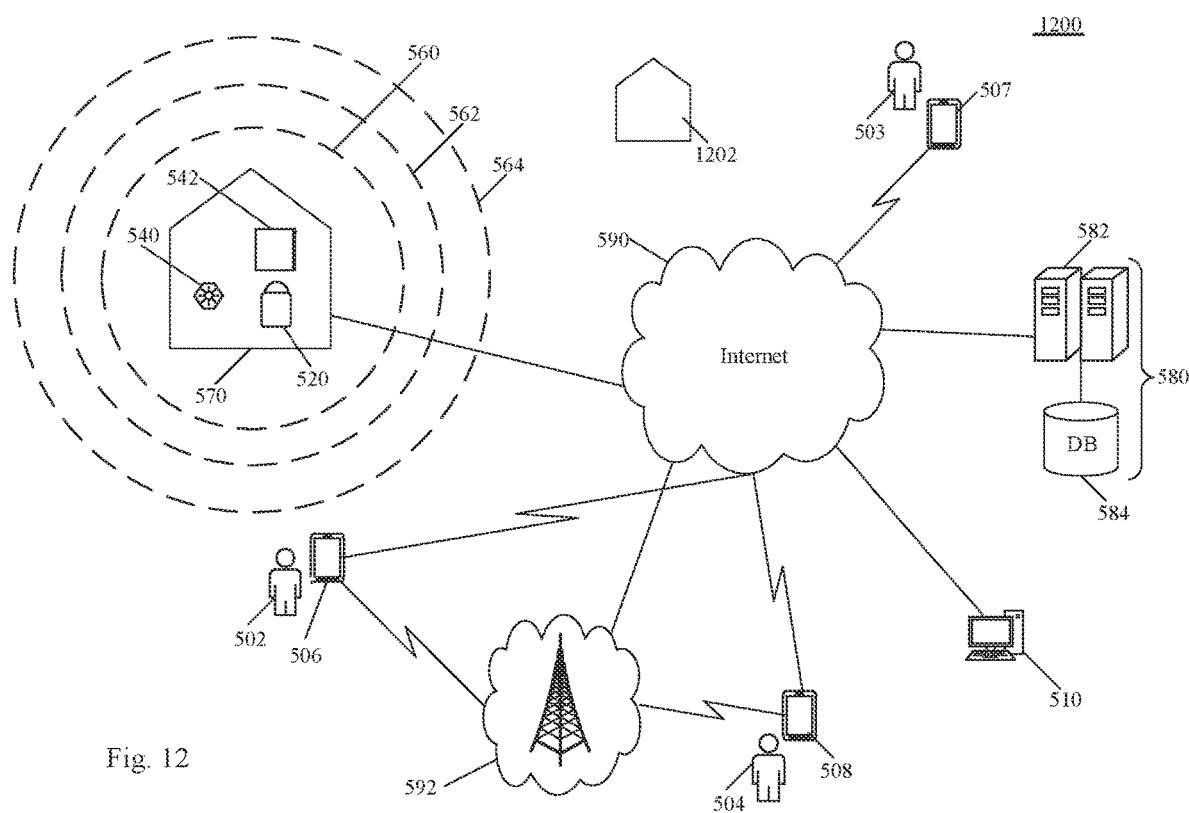
FIG. 12 is a simplified diagram depicting a communication system for managing real estate showings in accordance with the teachings of this disclosure.

For a particular showing appointment on the listing 570, the showing agent 502 may show the property 570 earlier or later than the showing appointment. For example, the showing agent 502 starts the showing at 2:20 PM for a showing appointment of 2:00 PM-2:30 PM on the day of this showing appointment. The showing is thus started late. It is later than the showing appointment's starting time of 2:00 PM. Suppose that another showing agent 503 (shown in FIG. 12 and operating a showing agent mobile device 507 running the specialized mobile software application) has a showing appointment on the listing 570 between 2:45 PM and 3:15 PM on the same day and arrives at the property 570 at 2:40 PM while the agent 502 is still showing the property 570. In such a case, the real estate showing appointment management system 582 automatically reschedule the subsequent showing appointment for the agent 503 and notifies both showing agent mobile devices 506 and 507.

Figure 13:
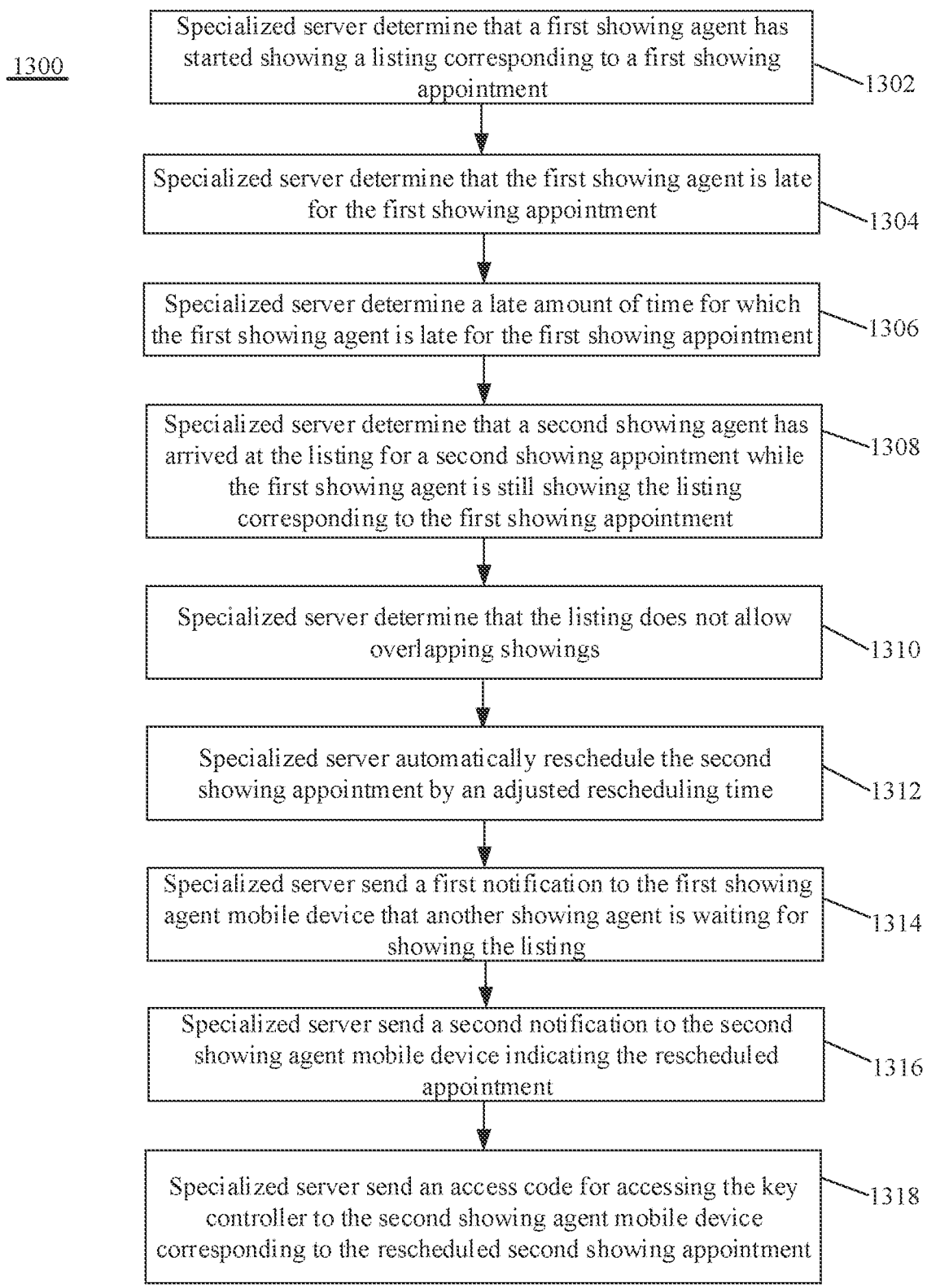
FIG. 13 is a flowchart illustrating a process by which a showing appointment management system automatically reschedules a subsequent showing appointment on a listing based on the real-time status of a previous showing appointment on the same listing in accordance with the teachings of this disclosure.

The automatic rescheduling is further illustrated by reference to FIG. 13. Referring now to FIG. 13, a flowchart illustrating a process by which the real estate showing appointment management system 582 automatically reschedules a subsequent showing appointment on a listing based on the real-time status of a previous showing appointment on the same listing is shown and generally indicated at 1300. At 1302, the specialized server software application determines that a first showing agent has started a showing of the listing 570 corresponding to a first showing appointment. For example, at 126, the specialized server software application determines that the showing agent 502 is at the listing 507 and has started a showing corresponding to the first showing appointment from 2:30 PM to 3:00 PM.

At 1304, the specialized server software application determines that the first showing agent is late for the first showing appointment. For example, the determination is made when the time of the geo-fence breach notification received at 106 from the device 506 is after the beginning time of the first showing appointment determined at 110. As another example, when the time of the showing starting notification message, received at 1102, is after the beginning time of the first showing appointment, the first showing agent is said to be late for the first showing appointment. The difference is the late amount of time and calculated at 1306. At 1308, the specialized server software application determines that a second showing agent has arrived at the listing 570 for a second showing appointment while the first showing agent 502 is still showing the listing 570. The second showing agent 503 is said to have arrived at the listing 570 when a corresponding geo-fence breaching notification is received at 106 from the device 507. If the arrival time is after the first agent's 502 arrival time and before the first agent's 502 showing is over, it is said that the second agent 503 arrives when the first agent 502 is still showing the listing 570 for the first showing appointment. Element determines whether the first agent's 502 showing is over. Alternatively, it is over when the current time is after the ending time of the first showing appointment plus the late amount of time.

At 1310, the specialized server software application determines that the listing 570 does not allow overlapping showings. In other words, at 1310, the specialized server software application determines that the listing 570 is configured to not allow two showing appointments do not have overlapping time. This limitation is configured and saved into the database 584. At 1312, the specialized server software application automatically reschedules the second showing appointment. For example, when the showing agent 502 starts the first showing at 2:20 PM for the first showing appointment of 2:00 PM-2:30 PM and the showing agent 503 arrives at the listing 570 at 2:40 PM for the second showing appointment 2:45 PM-3:15 PM on the same day, the specialized server software application automatically reschedules the second showing appointment to 3:05 PM-3:35 PM by the late amount of time. Alternatively, rescheduled appointment is moved into the future by a fixed amount of time, such as 30 minutes. Both the late amount of time and the fixed amount of time for the rescheduling are referred herein as the adjusted rescheduling time. Furthermore, in certain situation, such as during a pandemic, some amount of separation time between two consecutive showing appointments is desired. In such a case, the adjusted rescheduling time is determined such that the time difference between the expected ending time of the first showing and the beginning time of the rescheduled second showing appointment is at least the predetermined separation time.

At 1314, the specialized server software application sends a first notification message to the showing agent device 506 that the second showing agent 503 is waiting for showing the listing 570. At 1316, the specialized server software application sends a second notification message to the showing agent device 507 of the rescheduled second showing appointment. At 1318, the specialized server software application sends an access code for accessing the key controller 520 to the second showing agent mobile device 507. The new access code corresponds to the rescheduled second showing appointment.

Figure 14:
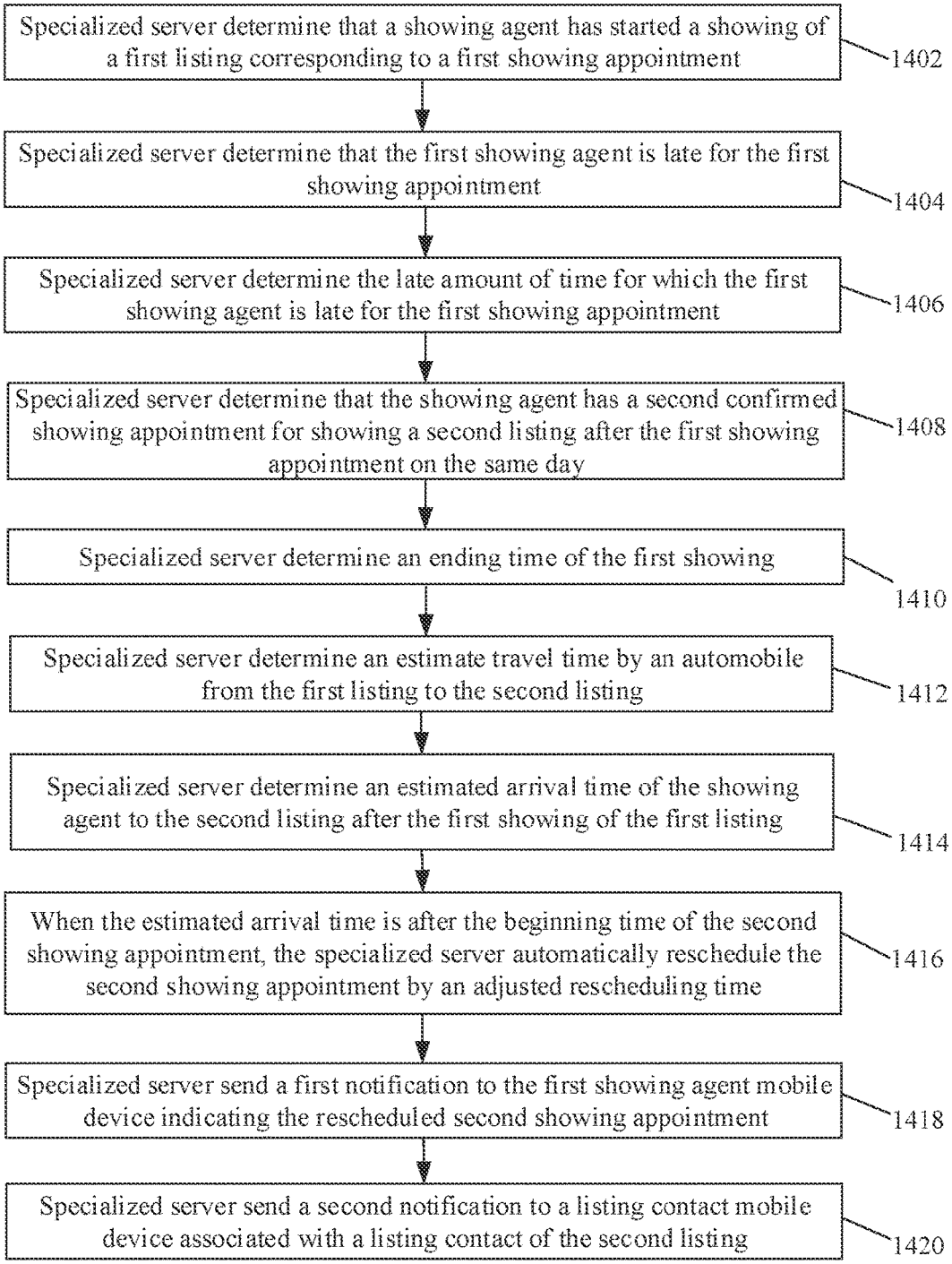
FIG. 14 is a flowchart illustrating a process by which a showing appointment management system automatically reschedules a subsequent showing appointment on a second listing based on the real-time status of a first showing appointment on a first listing in accordance with the teachings of this disclosure.

Turning to FIG. 14, a flowchart illustrating a process by which the real estate showing appointment management system 582 automatically reschedules a subsequent showing appointment on a second listing based on the real-time status of a previous showing appointment on a first listing is shown and generally indicated at 1400. At 1402, the specialized server software application determines that the showing agent 502 has started a showing of the listing 570 corresponding to a first showing appointment. For example, at 126, the specialized server software application determines that the showing agent 502 is at the listing 507 and has started a showing corresponding to the first showing appointment, such as one between 2:30-3:00 PM on a particular day.

At 1404, the specialized server software application determines that the showing agent 502 is late for the first showing appointment. For example, the determination is made when the time of the geo-fence breach notification received at 106 is after the beginning time of the first showing appointment determined at 110. The difference is the late amount of time and calculated at 1406. For instance, if the showing agent 502 arrives the listing 570 at 2:20 PM, she is 20 minutes late. At 1408, the specialized server software application determines that the showing agent has a confirmed second showing appointment for showing a second listing (such as the listing 1202 shown in FIG. 12) after the first showing appointment on the same day.

At 1410, the specialized server software application determines an ending time of the first showing corresponding to the first showing appointment. In one implementation, the ending time is the ending time of the first showing appointment, which is 3:00 PM in the above example, plus the late amount of time determined at 1406. In the example above, the estimated ending time is 3:20 PM. At 1412, the specialized server software application determines the estimate travel time by, for example, an automobile from the first listing to the second listing. It can be achieved by, for example, calling a commercial map service's API (application programming Interface) to determine the travel time. At 1414, the specialized server software application determines the estimated arrival time of the showing agent 502 to the second listing 1202 after she finishes the first showing of the listing 520. For instance, the estimated arrival time is the ending time of the first showing plus the estimated travel time.

At 1416, the specialized server software application automatically reschedules the second showing appointment by an adjusted rescheduling time when the estimated arrival time is after the beginning time of the second showing appointment. For example, when the estimated arrival time is 15 minutes after the beginning time of the second showing appointment, the second showing appointment is pushed into the future by 15 minutes, or a predetermined amount of time, such as 30 minutes. At 1418, the specialized server software application sends a first notification to the showing agent mobile device 506 indicating the rescheduled second showing appointment. At 1420, the specialized server software application sends a second notification to a listing contact, such as the listing agent and/or the home owner of the second listing 1202, indicating that rescheduled second showing appointment.

Figure 15:
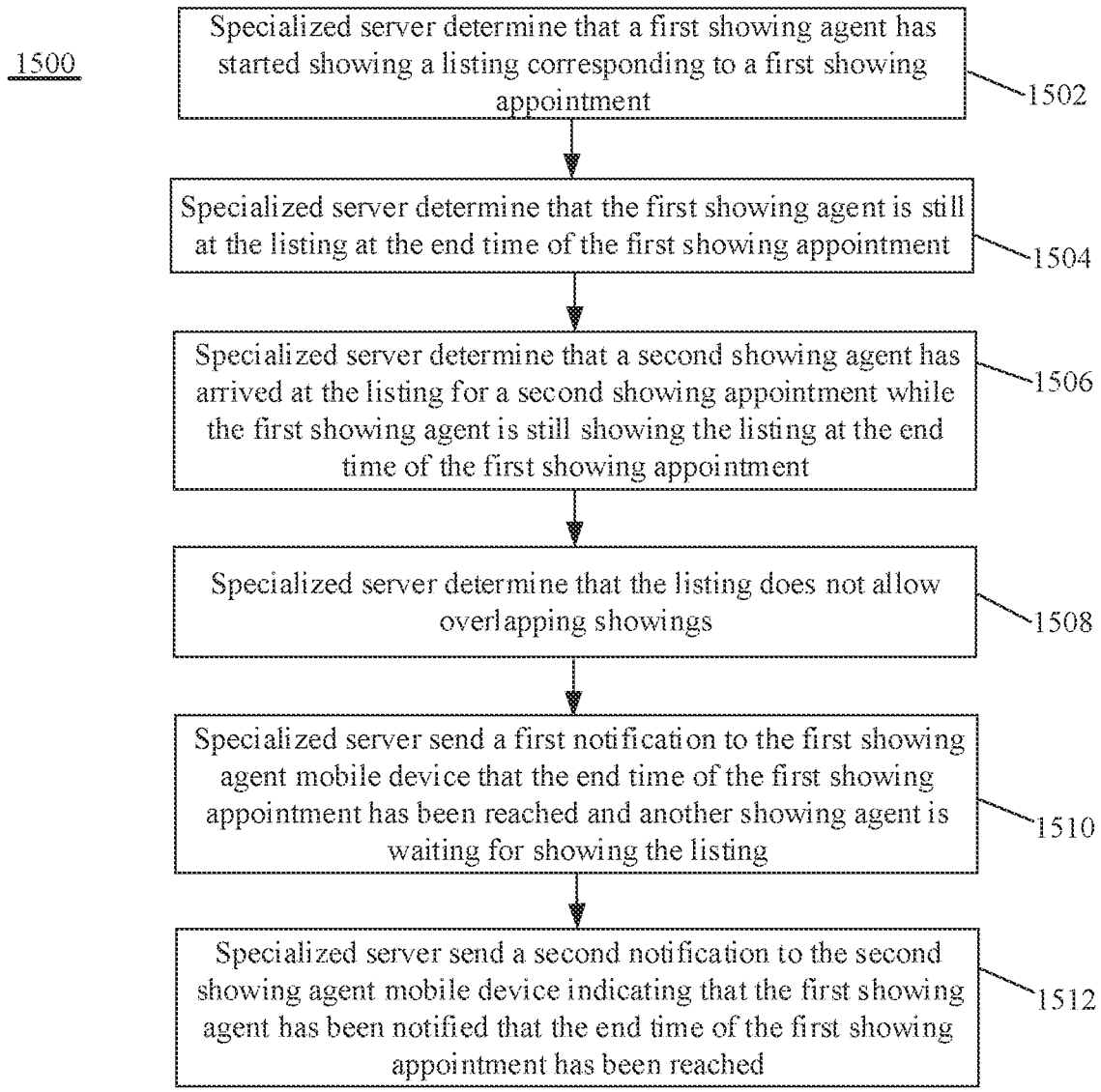
FIG. 15 is a flowchart illustrating a process by which a showing appointment management system automatically notifies showing agents when the end time of a first showing appointment has been reached in accordance with the teachings of this disclosure.

When a first showing agent is still showing a listing at the end time of a first showing appointment on the listing while a second showing agent has arrived at the listing for a second showing appointment on the same listing, the real estate showing appointment management system 582 automatically notifies the first showing agent mobile device 506 that the end time of the first showing appointment has come. It also sends a notification message to the second showing agent device 507 that the first showing agent 502 has been notified that the end time of the first showing appointment has been reached. The automatic notification process is further illustrated by reference to FIG. 15. Referring now to FIG. 15, a flowchart illustrating the process is shown and generally indicated at 1500. At 1502, the specialized server software application determines that a first showing agent has started a showing of the listing 570 corresponding to a first showing appointment. For example, at 126, the specialized server software application determines that the showing agent 502 is at the listing 507 and has started a showing corresponding to the first showing appointment from 2:30 PM to 3:00 PM.

At 1504, the specialized server software application determines that the first showing agent is still at the listing at or after the end time of the first showing appointment. For example, the determination is made when the specialized server software application does not receive a notification indicating that the geographical location of the first showing agent mobile device 506 is out of the geo-fence 560, 562 or 564 at or after the end time of the first showing appointment. At 1506, the specialized server software application determines that a second showing agent 503 has arrived at the listing 570 for a second showing appointment while the first showing agent 502 is still showing the listing 570 at or after the end time of the first showing appointment. The second showing agent 503 is said to have arrived at the listing 570 when a corresponding geo-fence breaching notification is received at 106 from the device 507.

At 1508, the specialized server software application determines that the listing 570 does not allow overlapping showings. At 1510, the specialized server software application automatically sends a first notification to the first showing agent mobile device 506 that the end time of the first showing appointment has been reached and another showing agent is waiting for showing the listing 570. In a further implementation, at 1512, the specialized server software application automatically sends a second notification to the second showing agent mobile device 507 indicating that the first showing agent 502 has been notified that the end time of the first showing appointment has been reached.

Obviously, many additional modifications and variations of the present disclosure are possible in light of the above teachings. Thus, it is to be understood that, within the scope of the appended claims, the disclosure may be practiced otherwise than is specifically described above. For example, the specialized servers 582 can be a cloud server system or a server farm.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A real estate showing management system comprising:
a database storing and providing data;
a specialized server having a processor, a specialized server software application running on said processor, a memory operatively coupled to said processor, and a network interface operatively coupled to said processor and adaptively coupled to said database and the Internet;
said specialized server software application adapted to:
receive a request for making a first showing appointment of a listing for a first showing agent, said first showing agent associated with a first showing agent mobile device adapted to communicate with said specialized server over said Internet, and said first showing appointment including a first beginning time and a first end time;

create said first showing appointment;

create a first set of geo-fences around said listing, said first set of geo-fences including a first geo-fence;

determine a geo-fence notification time to notify said first showing agent mobile device of said set of geo-fences;

at said geo-fence notification time, send a geo-fence notification to said first showing agent mobile device;

receive a request from said first showing agent mobile device for said first set of geo-fences;

provide said first set of geo-fences to said first showing agent mobile device;

receive a geo-fence breach notification from said first showing agent mobile device after said first showing agent mobile device has breached said first geo-fence, wherein said geo-fence breach notification indicates a showing agent identifier of said first showing agent;

based on said first showing appointment, said geo-fence breach notification and a time of said geo-fence breach notification, determine that said first showing agent should have access to said listing;

send an access code for accessing a key controller associated with said listing to said first showing agent mobile devices;

receive a key controller open notification from a key controller, wherein said key controller open notification indicates said first showing agent identifier;

based on said first showing appointment, said geo-fence breach notification, said time of said geo-fence breach notification, said key controller open notification and a time of said key controller open notification, determine that said first showing agent has started showing said listing corresponding to said first showing appointment;

determine that said first showing agent is late for said first showing appointment;

determine a late amount of time for which said first showing agent is late for said first showing appointment;

determine that a second showing agent has arrived at said listing for a second showing appointment for said listing while said first showing agent is still showing said listing corresponding to said first showing appointment, said second showing appointment including a second beginning time and a second end time;

determine that said listing does not allow overlapping showings;

automatically reschedule said second showing appointment by an adjusted rescheduling time, thereby forming a rescheduled second showing appointment;

send a first notification to a first showing agent mobile device, associated with said first showing agent and adapted to communicate with said specialized server over the Internet, that another showing agent is waiting for showing said listing; and send a second notification to a second showing agent mobile device associated with said second showing agent and adapted to communicate with said specialized server over the Internet, said second notification indicating said rescheduled second showing appointment.

2. The real estate showing management system of claim 1 wherein said specialized server software application is further adapted to:
receive a showing starting notification message from said first showing agent mobile device; and
determine that said first showing agent is late for said first showing appointment when said showing starting notification message is received after said first beginning time of said first showing appointment.

3. The real estate showing management system of claim 1 wherein said specialized server software application is further adapted to send an access code for accessing a key controller corresponding to said listing to said second showing agent mobile device, said an access code corresponding to said rescheduled second showing appointment.

4. The real estate showing management system of claim 1 wherein said adjusted rescheduling time is said late amount of time or a fixed amount of time.

5. A real estate showing management system comprising:
a database storing and providing data;
a specialized server having a processor, a specialized server software application running on said processor, a memory operatively coupled to said processor, and a network interface operatively coupled to said processor and adaptively coupled to said database and the Internet;
said specialized server software application adapted to:
receive a request for making a first showing appointment of a first listing for a showing agent, said showing agent associated with a showing agent mobile device adapted to communicate with said specialized server over said Internet, said first showing appointment including a first beginning time and a first end time;
create said first showing appointment;
create a first set of geo-fences around said first listing, said first set of geo-fences including a first geo-fence;
determine a geo-fence notification time to notify said showing agent mobile device of said set of geo-fences;
at said geo-fence notification time, send a geo-fence notification to said showing agent mobile device;
receive a request from said showing agent mobile device for said first set of geo-fences;
provide said first set of geo-fences to said showing agent mobile device;
receive a geo-fence breach notification from said showing agent mobile device after said showing agent mobile device has breached said first geo-fence, wherein said geo-fence breach notification indicates a showing agent identifier of said showing agent;
based on said first showing appointment, said geo-fence breach notification and a time of said geo-fence breach notification, determine that said showing agent should have access to said first listing;
send an access code for accessing a key controller associated with said first listing to said showing agent mobile device;
receive a key controller open notification from a key controller, wherein said key controller open notification indicates said showing agent identifier; and
determine that said showing agent has started said first showing of said first listing,
based on said first showing appointment, said geo-fence breach notification, said time of said geo-fence breach notification, said key controller open notification and a time of said key controller open notification, determine that said showing agent has started said first showing of said first listing corresponding to said first showing appointment;

determine that said showing agent is late for said first showing appointment;

determine a late amount of time for which said showing agent is late for said first showing appointment;

determine that said showing agent has a second confirmed showing appointment for showing a second listing after said first showing appointment on a same day, said second showing appointment including a second beginning time and a second end time;

determine an ending time of said first showing;

determine an estimated travel time from said first listing to said second listing;

determine an estimated arrival time of said showing agent to said second listing after said first showing;

when said estimated arrival time is after said second beginning time, automatically reschedule said second showing appointment by an adjusted rescheduling time, thereby forming a rescheduled second showing appointment; and send a first notification to a showing agent mobile device, associated with said showing agent and adapted to communicate with said specialized server over the Internet, indicating said rescheduled second showing appointment.

6. The real estate showing management system of claim 5 wherein said specialized server software application is further adapted to:

i) receive a showing starting notification message from said showing agent mobile device; and ii) determine that said showing agent is late for said first showing appointment when said showing starting notification message is received after said first beginning time of said first showing appointment.

7. The real estate showing management system of claim 5 wherein said specialized server software application is further adapted to send a second notification to a listing contact mobile device associated with a listing contact of said second listing, said listing contact mobile device associated with said listing contact.

8. The real estate showing management system of claim 5 wherein said adjusted rescheduling time is said late amount of time or a fixed amount of time.

9. A method for automatically rescheduling showings based on multiple factors, said method performed within a real estate showing management system and comprising:

receiving a request for making a first showing appointment of a listing for a first showing agent, said first showing agent associated with a first showing agent mobile device adapted to communicate with a specialized server running a real estate showing management system and having a processor and a memory operatively coupled to said processor and a network interface operatively coupled to said processor and adaptively coupled to a database and Internet, and said first showing appointment including a first beginning time and a first end time;

creating said first showing appointment;

creating a first set of geo-fences around said listing, said first set of geo-fences including a first geo-fence;

determining a geo-fence notification time to notify said first showing agent mobile device of said set of geo-fences;

at said geo-fence notification time, sending a geo-fence notification to said first showing agent mobile device;

receiving a request from said first showing agent mobile device for said first set of geo-fences;

providing said first set of geo-fences to said first showing agent mobile device;

receiving a geo-fence breach notification from said first showing agent mobile device after said first showing agent mobile device has breached said first geo-fence, wherein said geo-fence breach notification indicates a showing agent identifier of said first showing agent;

based on said first showing appointment, said geo-fence breach notification and a time of said geo-fence breach notification, determining that said first showing agent should have access to said listing;

sending an access code for accessing a key controller associated with said listing to said first showing agent mobile device;

receiving a key controller open notification from a key controller, wherein said key controller open notification indicates said first showing agent identifier;

determining that said first showing agent has started showing said listing;

based on said first showing appointment, said geo-fence breach notification, said time of said geo-fence breach notification, said key controller open notification and a time of said key controller open notification, determining that said first showing agent has started showing said listing corresponding to said first showing appointment by said specialized server software application;

determining that said first showing agent is late for said first showing appointment;

determining a late amount of time for which said first showing agent is late for said first showing appointment;

determining that a second showing agent has arrived at said listing for a second showing appointment for said listing while said first showing agent is still showing said listing corresponding to said first showing appointment, said second showing appointment including a second beginning time and a second end time;

determining that said listing does not allow overlapping showings;

automatically rescheduling said second showing appointment by an adjusted rescheduling time, thereby forming a rescheduled second showing appointment;

sending a first notification to a first showing agent mobile device, associated with said first showing agent and adapted to communicate with said specialized server over the Internet, that another showing agent is waiting for showing said listing; and sending a second notification to a second showing agent mobile device associated with said second showing agent and adapted to communicate with said specialized server over the Internet, said second notification indicating said rescheduled second showing appointment.

10. The method of claim 9 further comprising:

i) receiving a showing starting notification message from said first showing agent mobile device; and determining that said first showing agent is late for said first showing appointment when said showing starting notification message is received after said first beginning time of said first showing appointment.

11. The method of claim 9 further comprising sending an access code for accessing a key controller corresponding to said listing to said second showing agent mobile device, said an access code corresponding to said rescheduled second showing appointment.

12. The method of claim 9 wherein said adjusted rescheduling time is said late amount of time or a fixed amount of time.

* * * * *

UNITED STATES PATENT AND TRADEMARK OFFICE
CERTIFICATE OF CORRECTION

PATENT NO. : 11,580,503 B1
APPLICATION NO. : 17/114608
DATED : February 14, 2023
INVENTOR(S) : Scott E. Woodard et al.

It is certified that error appears in the above-identified patent and that said Letters Patent is hereby corrected as shown below:

In the Claims

Column 19, Line 29, Claim 1:
"agent mobile devices;" should read --agent mobile device;--.

Column 20, Line 62, Claim 5:
"cation indicates said showing agent identifier; and" should read --cation indicates said showing agent identifier;--.

Column 20, Line 64, Claim 5:
"showing of said first listing," should read --showing of said first listing;--.

Column 22, Line 62, Claim 10:
"i) receiving a showing starting notification message from" should read --receiving a showing starting notification message from--.

Signed and Sealed this
Fourteenth Day of March, 2023

Katherine Kelly Vidal
*Director of the United States Patent and Trademark Office*